United States Patent
Purta et al.

(10) Patent No.: US 7,387,712 B2
(45) Date of Patent: Jun. 17, 2008

(54) CATALYTIC PROCESS FOR THE TREATMENT OF ORGANIC COMPOUNDS

(75) Inventors: David A. Purta, Gibsonia, PA (US); Marc A. Portnoff, Pittsburgh, PA (US); Faiz Pourarian, Wexford, PA (US); Margaret A. Nasta, McKeesport, PA (US); Jingfeng Zhang, Gibsonia, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 284 days.

(21) Appl. No.: 10/273,390

(22) Filed: Oct. 17, 2002

(65) Prior Publication Data

US 2004/0074759 A1    Apr. 22, 2004

(51) Int. Cl.
C07C 1/00     (2006.01)
C07F 1/00     (2006.01)
B01J 29/70   (2006.01)
C10G 11/00   (2006.01)

(52) U.S. Cl. .............. 204/157.15; 204/157.6; 208/46; 208/113

(58) Field of Classification Search ........... 204/157.15, 204/157.6; 208/46, 108, 109, 111.05, 111.25, 208/111.35, 145, 112, 113
See application file for complete search history.

(56) References Cited

U.S. PATENT DOCUMENTS

| | | | |
|---|---|---|---|
| 2,383,579 A | 8/1945 | Allen et al. | |
| 4,279,722 A | 7/1981 | Kirkbride | |
| 4,300,946 A | 11/1981 | Simons | |
| 4,302,436 A | 11/1981 | Sirovich et al. | |
| 4,389,239 A | 6/1983 | Klatt et al. | |
| 4,409,411 A | 10/1983 | Pez | |
| 4,456,693 A | 6/1984 | Welsh | |
| 4,545,879 A | 10/1985 | Wan et al. | |
| 4,555,395 A | 11/1985 | Sirovich et al. | |
| 4,560,816 A | 12/1985 | Davis, Jr. | |
| 4,604,187 A | 8/1986 | Ward | |
| 4,696,806 A | 9/1987 | Peterson et al. | |

(Continued)

FOREIGN PATENT DOCUMENTS

DE            196 31 201       2/1998

(Continued)

OTHER PUBLICATIONS

Takeya et al., "Novel Method of Edible Oil Hydrogenation. III. Soybean Oil Hydrogenation Using Hydrogen Storage Alloy", Nippon Shokuhin Kagaku Kogaku Kaishi (no month, 1999), vol. 43, No. 5, pp. 502-509.*

(Continued)

*Primary Examiner*—Edna Wong
(74) *Attorney, Agent, or Firm*—Michael Best & Friecrich LLP

(57) ABSTRACT

A process for the catalytic reaction of organic compounds, in which the organic compounds are contacted with a catalyst comprising an interstitial metal hydride, having a reaction surface, to produce a catalyst-organic compound mixture, energy is applied, monatomic hydrogen is produced at the reaction surface of the interstitial metal hydride, and the organic compounds are reacted with the monatomic hydrogen. Reactions accomplished by this process include petroleum hydrocracking and hydrotreating processes. The method's performance can be further enhanced using radio frequency (RF) or microwave energy.

49 Claims, 13 Drawing Sheets

Schematic diagram of a reactor configuration for the process of the present invention

U.S. PATENT DOCUMENTS

| | | | |
|---|---|---|---|
| 4,696,873 | A | 9/1987 | Yagasaki et al. |
| 4,839,085 | A | 6/1989 | Sandrock et al. |
| 4,853,507 | A | 8/1989 | Samardzija |
| 4,857,169 | A | 8/1989 | Abdo |
| 4,992,605 | A * | 2/1991 | Craig et al. ............ 585/240 |
| 5,233,109 | A | 8/1993 | Chow |
| 5,368,171 | A | 11/1994 | Jackson |
| 5,387,397 | A | 2/1995 | Strauss et al. |
| 5,455,370 | A | 10/1995 | Demmering et al. |
| 5,460,745 | A | 10/1995 | Lee |
| 5,508,457 | A | 4/1996 | Bayense et al. |
| 5,514,820 | A | 5/1996 | Assmann et al. |
| 5,525,126 | A | 6/1996 | Basu et al. |
| 5,532,392 | A | 7/1996 | Gheorghiu |
| 5,536,586 | A | 7/1996 | Tsushio et al. |
| 5,578,090 | A | 11/1996 | Bradin |
| 5,648,483 | A | 7/1997 | Granberg et al. |
| 5,705,722 | A | 1/1998 | Monnier et al. |
| 5,713,965 | A | 2/1998 | Foglia et al. |
| 5,728,271 | A | 3/1998 | Piskorz et al. |
| 5,882,623 | A * | 3/1999 | Zaluska et al. ......... 423/648.1 |
| 5,908,946 | A | 6/1999 | Stern et al. |
| 5,911,885 | A | 6/1999 | Owens |
| 5,914,014 | A | 6/1999 | Kartchner |
| 6,013,387 | A | 1/2000 | Yao et al. |
| 6,017,845 | A | 1/2000 | Ovalles et al. |
| 6,077,400 | A | 6/2000 | Kartchner |
| 6,080,381 | A | 6/2000 | Zaluska et al. |
| 6,086,830 | A | 7/2000 | Kartchner |
| 6,090,959 | A | 7/2000 | Hirano et al. |
| 6,147,196 | A | 11/2000 | Stern et al. |
| 6,165,643 | A | 12/2000 | Doyle |
| 6,171,475 | B1 | 1/2001 | Dufaud et al. |
| 6,171,479 | B1 | 1/2001 | Ovalles et al. |
| 6,174,501 | B1 | 1/2001 | Noureddini |
| 6,175,037 | B1 | 1/2001 | Tweedy |
| 6,184,427 | B1 | 2/2001 | Klepfer et al. |
| 6,211,390 | B1 | 4/2001 | Peter et al. |
| 6,242,723 | B1 | 6/2001 | Lautenschlager |
| 6,262,285 | B1 | 7/2001 | McDonald |
| 6,288,251 | B1 | 9/2001 | Tsuto et al. |
| 6,432,379 | B1 | 8/2002 | Heung |
| 6,440,057 | B1 | 8/2002 | Ergün et al. |
| 6,566,296 | B2 * | 5/2003 | Plantenga et al. ......... 502/162 |
| 6,596,055 | B2 * | 7/2003 | Cooper et al. ............ 95/116 |
| 6,680,042 | B1 | 1/2004 | Schulz et al. |
| 2002/0028176 | A1 | 3/2002 | Nakamura |
| 2002/0141939 | A1 | 10/2002 | Schulz et al. |

FOREIGN PATENT DOCUMENTS

| | | | |
|---|---|---|---|
| EP | 0 021 242 | | 7/1981 |
| EP | 0 198 243 | | 10/1986 |
| EP | 0 969 110 | | 1/2000 |
| EP | 1 018 856 | | 1/2000 |
| EP | 1 245 534 | | 10/2002 |
| GB | 795573 | | 5/1958 |
| GB | 1 563 357 | | 3/1980 |
| GB | 1563357 | A * | 3/1980 |
| GB | 2 361 918 | | 11/2001 |
| JP | 56 081668 | | 7/1981 |
| JP | 61124545 | | 6/1986 |
| JP | 61295204 | | 12/1986 |
| JP | 06170223 | | 6/1994 |
| JP | 11 323466 | | 11/1999 |
| RU | 1 266 052 | | 10/1996 |
| RU | 1 638 865 | | 11/1996 |
| RU | 1 638 866 | | 11/1996 |
| RU | 1 638 867 | | 11/1996 |
| SU | 791 768 | | 12/1980 |
| WO | WO 00/05327 | | 2/2000 |
| WO | WO 00/75098 | | 12/2000 |
| WO | WO 03 014272 | | 2/2003 |

OTHER PUBLICATIONS

Snijder et al., "Hydrogenation of Cyclohexane with Lanthanum Nickel Aluminum Hydride (LaNi5-xAlxHn) Metal Hydrides Suspended in Cyclohexane or Ethanol", Chem. Eng. Sci. (no month, 1993), vol. 48, No. 13, pp. 2429-2441.*

Snijder et al., "Hydrogenation of Cyclohexane with LaNi5-xAlxHn Metal Hydrides Suspended in Cyclohexane or Ethanol", Chem. Eng. Sci. (no month, 1991), vol. 48, No. 13, pp. 2429-2441.*

Gedye et al., "The Use of Microwave Ovens for Rapid Organic Synthesis", Tetrahedron Letters, © no month, 1996, pp. 279-282.*

Kharlamov et al., "Hydrogenation of Cyclohexene on Different Types of Catalysts", N. D. Zelinskii Institute of Organic Chemistry, Russian Academy of Sciences, Moscow 117913. Translated from Izvestiya Akademii Nauk, Seriya Khimicheskaya, No. 4, pp. 791-799, Apr. 1992, pp. 612-618.*

Sandrock, "A Panoramic Overview of Hydrogen Storage Alloys From a Gas Reaction Point of View", J. of Alloys and Compounds, vol. 293-295 (no month, 1999), pp. 877-888.*

Shihua, "A Review of Hydrogen Storage Materials Used as Catalysts to Hydrogenation and Dehydrogenation", Materials Review (no month, 1994), No. 5, pp. 20-24.*

V. A. Doroshenko, A. I. Zelenina and L. L. Popenko, Investigation of Catalytic Activity of Hydrides in the Desulfurisation Reactions of Liquid Hydrocarbon Fuels, International Journal of Hydrogen Energy, vol. 21, No. 11-12, p. 1125-1127, (1996), no month.

V. V. Lunin and Ashraf Z. Khan, Polymetallic Catalysts Derived from Intermetallic Hydrides, Journal of Molecular Catalysis, vol. 25, pp. 317-326 (1984), no month.

V. V. Lunin, B. Yu. Rakhamimov and L. A. Erivanskaya, Catalytic Activity of Hydrides of Alloys Based on Group IV Transition Metals in Aromatic Hydrocarbon Conversion, Isvestia Akademii Nauk SSR, Neorganicheskie Materialy, vol. 14, No. 9, pp. 1706-1709, (1978), no month.

F.A. Twaiq et al., "Catalytic Conversion of Palm Oil to Hydrocarbons: Performance of Various Zeolite Catalysts," Industrial Engineering Chemistry Research, vol. 38, 1999, pp. 3230-3237, XP002270690, no month.

Srivastava S. et al., "On the Synthesis and Characterization of Some New $AB_5$ Type $MmNi_{4.3}Al_{0.3}Mn_{0.4}$, $LaNi_{5-x}Si_x$ (x=0.1, 0.3, 0.5) and Mg-x wt% $CFMmNi_5$-y wt% Si Hydrogen Storage materials," International Journal of Hydrogen Energy, Elsevier Science Publishers B.V., Barking, GB, vol. 25, No. 5, May 2000, pp. 431-440, XP004188718.

*Biodiesel Production and Quality* (Mar. 11, 2002), http://www.diodiesel.org/pdf_files/fuelfactsheets/prod_quality.pdf.

Canakci, et al., Paper No. 016049, 2001 ASAE Annual International Meeting, Sacramento, CA, Jul. 30-Aug. 1, 2001.

Breccia, et al., *Reaction Between Methanol and Commercial Seed Oils Under Microwave Irradiation*, International Microwave Power Institute (1999), no month.

Schuchardt, et al., *Transesterification of Vegetable Oils: A Review*, J. Braz. Chem. Soc., vol. 9, No. 3, 199-210 (1998), no month.

Knothe, et al., *Biodiesel: The Use of Vegetable Oils and Their Derivatives as Alternative Diesel Fuels*, Fuels and Chemicals from Biomass, American Chemical Society (1997), no month.

Mazzocchia, et al., *Fatty Acid Methyl Esters Synthesis from Triglycerides Over Heterogeneous Catalysts in Presence of Microwaves*, 3rd World Congress on Microwave and RF Applications, no date.

S. D. Pollington, et al., "The Influence of Microwaves on the Rate of Reaction of Propan-1-ol with Ethanoic Acid", Journal of Organic Chemistry, American Chemical Society, Easton, U.S., vol. 56, 1991, pp. 1313-1314, no month.

A. Dasgupta et al., "Use of Microwave Irradiation for Rapid Transesterification of Lipids and Accelerated Synthesis of Fatty Acyl Pyrrolidides for Analysis by Gas Chromatography-Mass Spectrometry: Study of Fatty Acid Profiles of Olive Oil, Evening Primrose Oil, Fish Oils and Phospholipids from Mango Pulp", Chemistry and Physics of Lipids, Limerick, IR, vol. 62, No. 3, 1992, pp. 281-291, no month.

P. Banerjee, et al., "Enrichment of Saturated Fatty Acid Containing Phospholipids in Sheep Brain Serotonin Receptor Preparations: Use of Microwave Irradiation for Rapid Transesterification of Phospholipids," Biochimica et Biophysica Acta, vol. 1110, 1992, pp. 65-74, no month.

M. Khan, et al., "Microwave-Mediated Methanolysis of Lipids and Activation of Thin-Layer Chromatographic Plates," Lipids, vol. 28, No. 10, 1993, pp. 953-955, no month.

M. Vacek, et al., "Selective Enzymic Esterification of Free Fatty Acids with N-Butanol Under Microwave Irradiation and Under Classical Heating", Biotechnology Letters, vol. 22, 2000, pp. 1565-1570, no month.

Takeya, Koji, et al., "Soybean Oil Hydrogenation Using Hydrogen Storage Alloy," Nippon Shokuhin Kagaku Kogaku Kaishi, vol. 43, No. 5, 1996, pp. 502-509. (English Translation).

Mazzocchia, C. et al., "Fast Synthesis of Biodiesel from Triglycerides in Presence of Microwaves," Advances in Microwave and Radio Frequency Processing, 8th International Conference on Microwave and High Frequency Heating, Bayreuth, Germany, Sep. 3-7, 2001, pp. 370-376 (Copyright 2006).

Noureddini, H. et al., "Kinetics of Transesterification of Soybean Oil," J. Am. Oil Chem. Soc., vol. 74, No. 11, 1997, pp. 1457-1463, no month.

Rohm and Haas Company, Amberlyst® A26 OH, Industrial Grade Strongly Basic Polymeric Resin, For Catalysis and Separation Technologies, Product Data Sheet, IE-631 EDS, Apr. 2001, 2 pgs.

Canakci, M. et al., "A Pilot Plant to Produce Biodiesel from High Free Fatty Acid Feedstocks," Presented as Paper No. 016049 at the 2001 ASAE Annual International Meeting, Sacramento, CA, Jul. 30-Aug. 1, 2001, pp. 1-29.

Canakci, M. et al., "Biodiesel Production from Oils and Fats with High Free Fatty Acids," Transactions of the ASAE, vol. 44(6), 2001, pp. 1429-1436, no month.

Gedye, R. et al., "The Use of Microwave Ovens for Rapid Organic Synthesis," Tetrahedron Letters, vol. 27, No. 3, 1986, pp. 279-282, no month.

Giguere, R. et al., "Application of Commercial Microwave Ovens to Organic Synthesis," Tetrahedron Letters, vol. 27, No. 41, 1986, pp. 4945-4948, no month.

An Yue, et al., "Hydrogen Absorption Properties of Rare Earth Hydride Slurry," *Journal of the Chinese Rare Earth Society*, vol. 17, No. 2, Jun. 1999, pp. 130-134 (English Translation Provided).

Tong Shihua, "A Review of Application of Hydrogen Storage Materials Used as Catalysts to Hydrogenation and Dehydrogenation," *Materials Review*, No. 5, 1994, pp. 20-24 (English Translation Provided), no month.

Berdonosov, S.S., "Microwave Chemistry (Microvolnovaya Khimiya)," Sorosovsky obrazovatelny zhurnal (2001) 7 (1):32-38, no month.

* cited by examiner

Schematic diagram of a reactor configuration for the process of the present invention Schematic diagram of a reactor configuration for the process of the present invention with the capability of preheating the gas and liquid and of recirculating the reaction mixture or components of the reaction mixture internally and externally.

Schematic diagram of a reactor configuration for the process of the present invention having the capability of recirculating the catalyst for regeneration or recharging.

Schematic diagram for improved handling the output for any reactor design for the process of the present invention having the capability of separating product into gas and liquid.

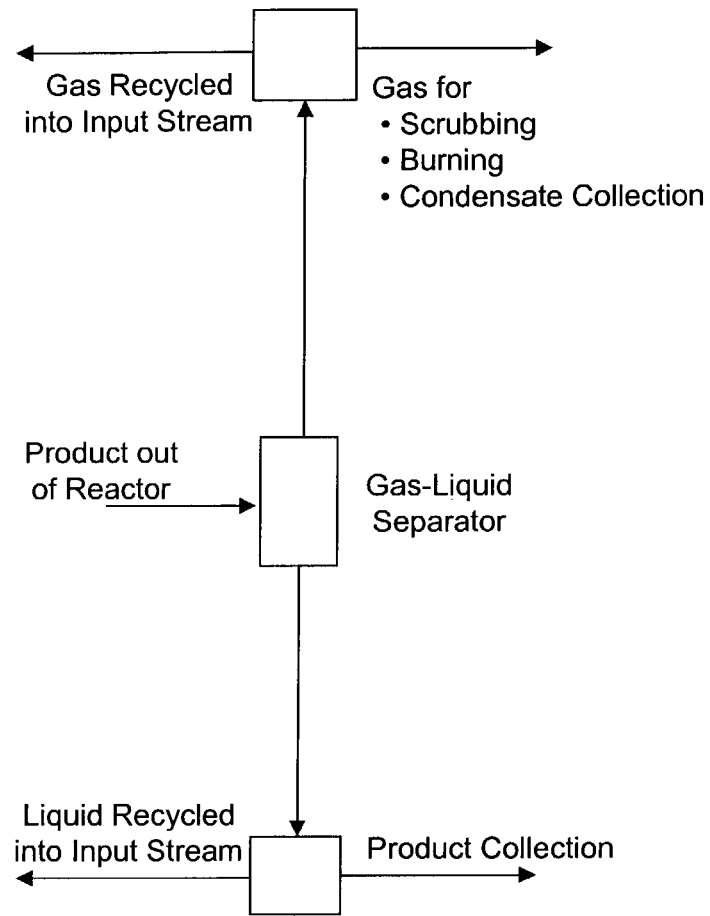

Schematic representation for improved handling the output for any reactor design for the process of the present invention having the capability of gas product collection, gas product recycling, liquid product collection and liquid product recycling and a means for injecting the gas and liquid to be recycled to be injected back into the feed or input stream.

Fig. 9

Plot of hydrogen pressure versus hydrogen content at various temperatures for a catalyst of the present invention Plot of total hydrogen capacity versus temperature at ambient pressure for three example catalysts of the present invention.

Plot of dielectric loss tangent against microwave frequency for pitch residuum and microwave processed pitch Graph of pressure, temperature, microwave power and hydrogen flow as a function of time for a reaction catalyzed by the iMeH Cat 300 with palladium coated USY support

CATALYTIC PROCESS FOR THE TREATMENT OF ORGANIC COMPOUNDS

BACKGROUND OF THE INVENTION

1. Field of the Invention

This invention relates to a method for the hydroprocessing of organic compounds. This includes all types of petroleum hydrocracking and hydrotreating processes. This process can be used for the low pressure hydrogenation of organic compounds and petroleum using conventional heat sources. This method's performance can be further enhanced using radio frequency (RF) or microwave energy.

2. Description of Related Art

Hydrocarbons are subjected to a variety of physical and chemical processes to produce higher value products. These processes include fractionation, isomerization, bond dissociation and reformation, purification, and increasing hydrogen content. The processes tend to require high pressures and temperatures. Catalysts are employed in the processes for various reasons including, but not limited to, reducing the temperatures and pressures at which the hydrocarbon conversion reaction takes place. The term "hydroprocessing" is used to refer to the encompassing superset of these processes in which hydrogen is used.

Petroleum or crude oil is a naturally occurring mixture of hydrocarbons and smaller amounts of organic compounds containing heteroatoms such as sulfur, oxygen, nitrogen, and metals (mostly nickel and vanadium). The petroleum products obtained from crude oil processing vary considerably, depending on market demand, crude oil quality, and refinery objectives. In current industrial practices, crude oils are submitted to distillation under atmospheric pressure and under vacuum. The distillation fractions (including the residual fractions) undergo further catalytic refining processes so high-value products can be produced.

The hydrogen content of petroleum products is an important index of their economic value. In conventional hydrocracking and hydrotreating processes, the hydrogenation reactions of aromatic compounds play a crucial role. Heavy residual compounds are normally aromatic in nature. The complete or partial saturation of these compounds by hydrogen addition is an important step in their cracking into smaller, more valuable compounds. Conventional heavy oil hydrocracking processes require relatively high temperature (e.g. greater than 400° C.) and very high pressure (e.g. greater than 1000 psi). In current hydrotreating and hydroreforming processes, supported Ni—Mo and Co—Mo sulfided catalysts become active only at the high temperature range. In order for reactions to take place at a favorable lower temperature range, expensive noble metal catalysts are usually used in order to achieve good hydrogenation efficiency. Attempts have been made to find new classes of catalysts that would significantly lower the process parameters, while increasing the hydrogenation efficiency in terms of deep reduction of aromatic content, but the progress made thus far is mostly small improvements over existing catalyst systems.

As the name implies, hydrocracking combines catalytic cracking and hydrogenation by means of a bifunctional catalyst to accomplish a number of favorable transformations of particular value for the selected feedstocks. In a typical bifunctional catalyst, the cracking function is provided by an acidic support, whereas the hydrogenation function is provided by noble metals, or non-noble metal sulfides from Periodic Table Groups 6, 9, and 10 (based on the 1990 IUPAC system in which the columns are assigned the numbers 1 to 18). Hydrocracking is a versatile process for converting a variety of feedstocks, ranging from naphthas through heavy gas oils, into useful products. Its most unique characteristic involves the hydrogenation and breakup of polynuclear aromatics. Significant portions of these feedstocks are converted through hydrocracking into smaller-sized and more useful product constituents. However, some of the large aromatic complexes within these feedstocks, once partially hydrogenated via hydrocracking, can proceed to dehydrogenate forming coke on the catalysts. Coke formation is one of many deactivation mechanisms that reduce catalyst life.

In many refineries, the hydrocracker serves as the major supplier of jet and diesel fuel components (middle distillates). Because of the high pressure required and hydrogen consumption, conventional hydrocrackers are very costly to build and to operate. By developing a class of catalysts with high selectivity for middle distillates and favorable operating conditions, it is possible to significantly reduce these high costs while maximizing the production of the middle distillates.

To remove undesirable heteroatoms, desulfurization, denitrogenation, and demetallization processes are also accomplished using hydroprocessing methods. Because the values of petroleum products are directly related to their hydrogen contents, the effective hydrogenation of products is highly desirable in all stages of petroleum refining.

Metals, such as platinum, deposited on oxide supports, such as alumina or silica, are widely used in catalysts for hydrocarbon reforming reactions. The deposited metal provides reactive sites at which the desired reactions can occur. However, catalysts using these metals have the problem of being rendered inactive if heavy polyaromatic organic compounds build up and occupy or block the sites. The removal of sulfur and sulfur compounds are also a problem for these catalysts. Sulfur reacts with the catalytic sites of Pt or Pd metals and can also deactivate these sites by chemically binding to the metals. Successful catalysis requires that a suitable high local concentration of hydrogen be maintained during the catalytic process. Pressure and temperature conditions are selected to favor formation of the desired product, to provide a suitable rate of conversion, and to avoid rapid deactivation of the catalytic surface.

Hydroprocessing catalysts and their respective components can take many forms and structures. Much is known about optimizing catalyst performance for specific processes (e.g., hydrogenation, hydrocracking, hydrodemetallization and hydrodesulfurization). Regarding the catalyst form, the catalyst can be used as a powder, extrudate, or preformed matrix based upon the type of chemical reactor design selected (e.g., fluidized bed, fixed bed, catalytic converter).

An overall need remains, however, for improved catalysts and catalytic hydroprocesses that can be carried out under relatively mild conditions.

SUMMARY OF THE INVENTION

In one aspect, the invention provides a method for hydroprocessing an organic compound. The method comprises contacting the organic compound with a catalyst including an interstitial metal hydride having a reaction surface to produce a catalyst-organic compound mixture and applying energy to at least one of the catalyst and the catalyst-organic compound mixture. The method further comprises producing monatomic hydrogen at the reaction surface of the interstitial metal hydride and reacting the organic compound with the monatomic hydrogen. The reaction surface of the catalyst may be substantially free of an oxide layer.

In another aspect, the invention provides another method of hydroprocessing an organic compound. The method comprises contacting the organic compound with a catalyst comprising an interstitial metal hydride having a reaction surface to produce a catalyst-organic compound mixture. Microwave or RF energy is applied to at least one of the catalyst and the catalyst-organic compound mixture.

In a further aspect, the invention provides another method of hydroprocessing an organic compound. The method comprises contacting the organic compound with a catalyst including an interstitial metal hydride having a reaction surface and monatomic hydrogen at the reaction surface.

BRIEF DESCRIPTION OF THE DRAWINGS

FIG. 9 is a schematic representation for improved handling the output for any reactor design for the process of the present invention having the capability of gas product collection, gas product recycling, liquid product collection and liquid product recycling and a means for injecting the gas and liquid to be recycled to be injected back into the feed or input stream.

DETAILED DESCRIPTION OF THE INVENTION

Figure 1:
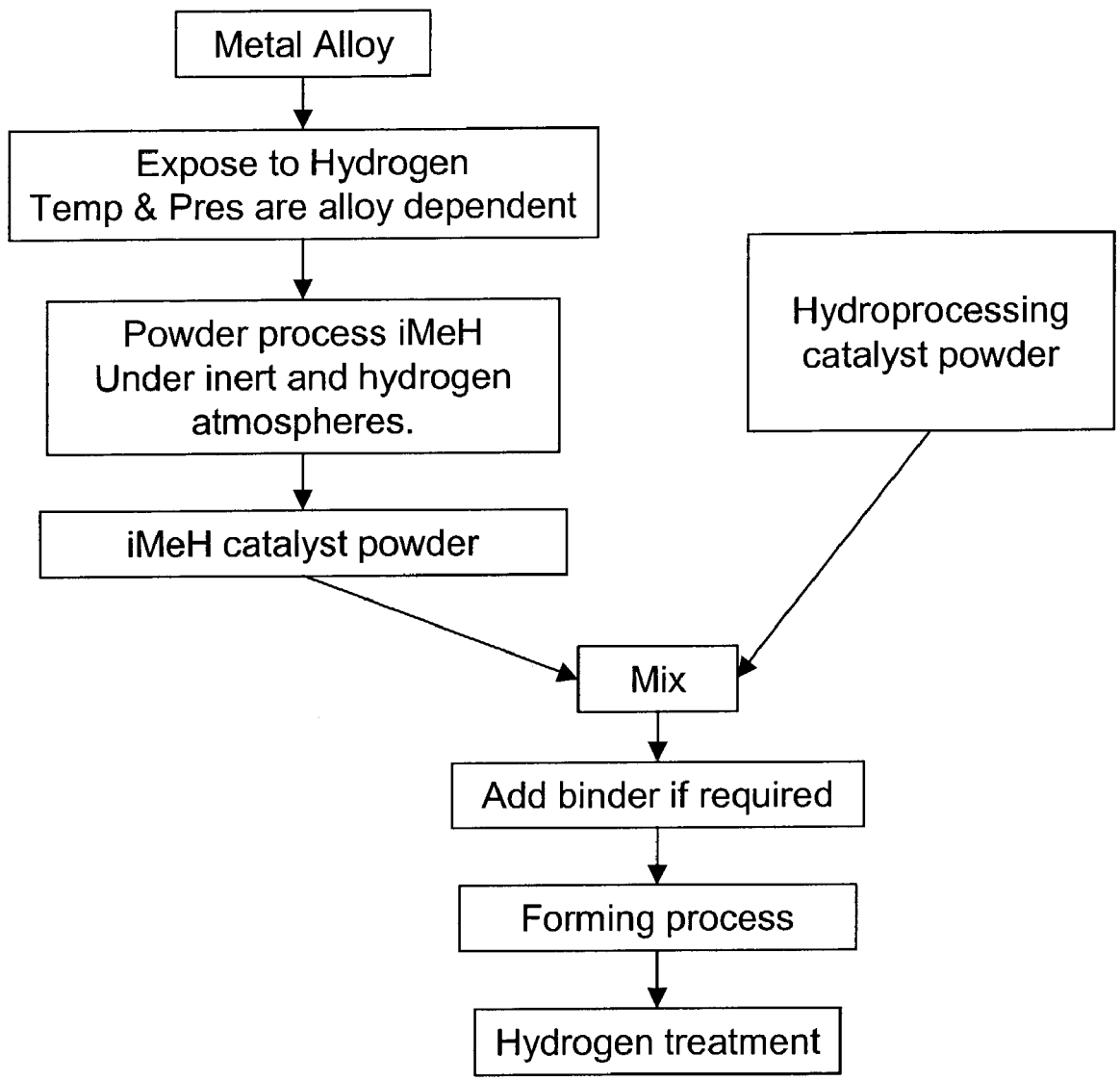
FIG. 1 is a diagram of a process for the production of a first catalyst of the present invention.

The present invention is directed to catalysts containing interstitial metal hydrides, having reaction surfaces at which monatomic hydrogen is available, and to any catalytic processes making use of these materials. The interstitial metal hydrides of the present invention (now specifically being defined as iMeH) are composed of alloyed metals combined with atomic hydrogen that is stored interstitially within their metal alloy matrix. These interstitial metal hydrides (iMeH), when configured according to the present invention comprise a catalyst capable of absorbing molecular hydrogen, and reacting monatomic hydrogen at the reaction surface. The catalysts of the present invention have reaction surfaces that may be kept substantially free of an oxide layer. Undesirable oxide species can inhibit the monatomic hydrogen from participating in the catalytic process. Production of an oxide layer is avoided, and reaction surfaces are kept substantially free of an oxide layer, by minimizing exposure of the catalyst to oxygen or water vapor at elevated temperatures, such as temperatures above 30° C. Exposure to oxygen and water vapor is minimized by surrounding the catalyst with a blanketing atmosphere of an inert gas such as nitrogen or argon which has been exposed to a desiccant. It has been found that the monatomic hydrogen concentration at the catalyst surface is maximized by exclusion of oxygen and water vapor at elevated temperatures. Monatomic hydrogen at the iMeH catalyst surface is monatomic hydrogen in close enough proximity to the surface to react, in the monatomic form, with a feedstock in contact with the surface.

In use, the interstitial metal hydride can be directly combined with the feedstock, at reaction temperatures, or the iMeH may be first formed into a composite with other materials to further enhance catalytic activity. The catalytic process of the present invention includes contacting the feedstock with a catalyst comprising an interstitial metal hydride, having a reaction surface, to produce a catalyst-feedstock mixture, applying energy to at least one of the catalyst and the catalyst-feedstock mixture, producing monatomic hydrogen at the reaction surface of the interstitial metal hydride, and reacting the feedstock with the monatomic hydrogen. In one embodiment of the invention, the feedstock is an organic compound.

Again, the interstitial metal hydrides are composed of alloyed metals combined with atomic hydrogen, which is stored interstitially within the metal alloy matrix. This matrix can have a crystalline or amorphous structure. The iMeH is especially suited to accommodating atomic hydrogen, abstracted from molecular hydrogen. The quantity of atomic hydrogen in the interstitial metallic hydrides has a measurable value, which is a function of alloy composition, and operating temperature and pressure. The hydrogen stored within an iMeH is not subject to ionic or covalent bonding. In an iMeH, the ratio of hydrogen to metal atoms may vary over a range and may not be expressible as a ratio of small whole numbers. The iMeH compounds of the present invention are able to dissociate diatomic hydrogen molecules at the surface into monatomic hydrogen, absorb copious amounts of monatomic hydrogen thus produced, and desorb the monatomic hydrogen under the appropriate conditions. A heat of absorption is produced when the molecular hydrogen dissociates into atomic hydrogen and the hydrogen atoms position themselves interstitially in the structure of the material. Additional energy at a suitable steady state process temperature and pressure is required for the release of monatomic hydrogen from within the catalyst. This energy can be derived from the process heat of reaction or from external application of energy or both. The atomic hydrogen thus provided is available to promote hydroprocessing and hydrogenation reactions. Without intending to be limited by the theory, the catalyst's activity of the present invention is believed to be due to the high concentration of available monatomic hydrogen, which the iMeH uniquely provide by the nature of their dissociation and absorption of molecular hydrogen ($H_2$) and subsequent reaction exchange of highly reactive monatomic hydrogen (H.) at the surface.

The catalytic activity of the catalyst of the present invention can be enhanced and controlled by exposing the catalyst to RF or microwave energy (1000 m-$10^{-4}$ m wavelength), either in the absence or presence of fuel fired heating or resistive heating. The RF or microwave energy can provide for a significant increase in hydroprocessing efficiency in comparison to conventional heating. Furthermore the microwave energy can be modulated and controlled in such a manner as to optimize the reaction exchange of the monatomic hydrogen from the iMeH. In one embodiment of the invention, the iMeH catalyst component is placed in contact with a separate absorber of RF or microwave energy. The separate absorber of RF or microwave energy absorbs the energy and transfers it to the iMeH through thermal conduction or convection, and may be one or more compounds such as silicon carbide, iron silicide, nickel oxide, and tungsten carbide. In another embodiment of the invention, the iMeH component functions as the primary absorber of RF or microwave energy. When used with microwave enhancement, the iMeH component is sufficiently dispersed within the catalyst and feedstock combination to solve the problem of hot spots and arcing generally associated with the introduction of metals into a microwave or RF field.

The selective use of RF or microwave energy to drive the catalytic component of the catalyst results in the direct reaction of the iMeH monatomic hydrogen into the feedstock. It is cost effective to maximize the use of fossil fuels to pre-heat the feedstocks to near reaction temperatures, and use minimum RF or microwave energy to drive and control the hydroprocessing reactions. Ideally there will be a minimized or zero net temperature increase from the RF or microwave energy into the catalyst support or into the feedstock because this energy is primarily targeted into the iMeH to enhance the reaction exchange of monatomic hydrogen. Selective coupling of the RF or microwave energy is accomplished through selection and control of the relative dielectric parameters of the catalyst's components and the feedstock. This results in efficient, economically viable catalytic processes, which are enhanced using microwaves.

The catalyst of the present invention may be used in all types of hydroprocesses or as a more specific example to hydrocrack organic compounds. In these processes, the feedstock, e.g. organic compounds, are contacted with an iMeH catalyst comprising a metal hydride capable of releasing monatomic hydrogen at its surface. The combination of the iMeH and feedstocks may be exposed to any number of process conditions, (such as temperature, pressure, and space velocity) suitable for a desired hydroprocessing reaction.

The catalyst enables hydroprocessing at milder conditions and significantly lower pressures. High reactivity, lower process pressures, and new degrees of selectivity and control using RF or microwaves provide for improved products and lower capital equipment and operating costs.

In the present invention, iMeH catalyst compositions having the following characteristics have been specifically identified:

High hydrogen storage capacity (Range from 0.01 wt %-7.5 wt % hydrogen in catalyst)

High molecular hydrogen absorption and monatomic hydrogen reaction rates (greater than 0.01 cc/min/gm), for given temperature or pressure changes. Typical operating pressures and temperatures can range from ambient to 1000 psig and ambient to 600° C. A typical value for hydrogen reaction rates is 1 cc/min/gm, and materials have been measured with values greater than 50 cc/min/gm.

Temperature-dependent desorption pressure

Ability to undergo repeated hydrogenation cycling

Tolerance for impurities

Using the invention disclosed herein, iMeH catalysts with high reaction rates can be designed for operation up to 3000 psi and 600° C.

The monatomic hydrogen provided in the presence of an iMeH catalyst permits higher reaction rates and milder reaction conditions to be used for a given process.

It is known that Pt and Pd dissociate molecular hydrogen into monatomic hydrogen when it is adsorbed onto the surface of these metals. The iMeH materials of the present invention have this property as well. The iMeH materials also store or absorb the dissociated molecular hydrogen into the bulk of the iMeH matrix as monatomic hydrogen whereas metals such as platinum do not.

Interstitial metal hydrides are produced by preparing samples of the constituent metals in the desired proportions, and combining them and heating them so that they melt together homogeneously to produce a metal alloy. The resulting metal alloy is then exposed to hydrogen at a temperature and pressure characteristic of the alloy so that the metal alloy takes up the hydrogen in monatomic form.

The iMeH materials of the present invention are typically prepared by a volumetric (gas to solid alloy) method at a known temperature and pressure using a stainless steel reactor. The metallic hydride will absorb hydrogen with an exothermic reaction. This hydrogenation process is reversible according to the following chemical reaction schematic:

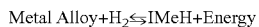

Metal Alloy+$H_2$⇌iMeH+Energy

During this process, hydrogen atoms will occupy interstitial sites in the alloy lattice.

The metal alloy from which an iMeH is produced can be prepared by mechanical or induction heated alloying processes. The metal alloy can be stoichiometric or hyper-stoichiometric. Hyper-stoichiometric compounds are compounds that exhibit wide compositional variations from ideal stoichiometry. Hyper-stoichiometric systems contain excess elements, which can significantly influence the phase stability of the metallic hydrides. The iMeH is produced from a metal alloy by subjecting the alloy to hydrogen at a pressure and temperature that is a characteristic of the particular alloy.

The iMeH catalysts of the present invention can be selected to have a desired lattice structure and thermodynamic properties, such as the applied pressure and temperature at which they can be charged and the operating pressure and temperature at which they can be discharged. These working thermodynamic parameters can be modified and fine tuned by an appropriate alloying method and therefore, the composition of the catalysts can be designed for use in a particular catalytic process.

The present invention is directed to catalysts containing interstitial metal hydrides. These hydrides are composed of alloyed metals combined with monatomic hydrogen that is stored interstitially within their metal alloy matrix. Multi-component metal alloys from which the iMeH catalysts of the present invention are produced include combinations of Group 4 elements with Group 5, 6, 7, 8, 9, 10 and 11 elements (based on the 1990 IUPAC system in which the columns are assigned the numbers 1 to 18). Also iMeH catalysts of this invention may be produced from alloys including all combinations of lanthanides (atomic numbers 58 to 71) with Group 7, 8, 9, 10 and 11 elements. For example, the alloy may be $A_x T_y$, in which A is one or more Group 4 elements and T is one or more Group 5, 6, 7, 8, 9 10 and 11 elements. In another example, A is one or more lanthanides and T is one or more Group 7, 8, 9, 10 and 11 elements. X and y are the composition values for the different elements in each series. These alloys may take the form of crystalline or amorphous fine powders, and the resulting interstitial metal hydrides have properties making them useful for hydroprocessing reactions in which the operating temperature ranges from ambient (20° C.) to 1000° C. and operating hydrogen pressures in the range from ambient (15 psi) to 2000 psi.

The iMeH serves as a high density source of interstitial monatomic reactive hydrogen and can be combined with known hydroprocessing catalysts such as noble metals, metal oxides, metal sulfides, zeolitic acid or base sites to further promote hydroprocessing of feedstocks such as organic compounds. The iMeH materials can be combined with other hydroprocessing materials in a variety of ways to build an optimized catalyst for a particular reaction or function. In general, the finer the powders being mixed (e.g. support, iMeH), the higher the surface area and the more intimate the mixing. Key to the processing steps is to minimize the exposure of iMeH to oxygen and/or water vapor at elevated temperatures (above 25° C.) for extended periods of time. Exposure can be minimized by use of desiccants and by blanketing atmospheres of inert gases such as nitrogen and argon. The iMeH is not calcined or subjected to an oxidizing environment at elevated temperatures.

Hydroprocessing catalysts and their respective components can take many forms and structures. Much is known about optimizing catalyst performance based upon process requirements (e.g., hydrogenation, hydrocracking, hydrodesulfurization (HDS), hydrodemetallization (HDM), and hydrodenitrogenation (HDN). For example, the catalyst can be used as a powder, extrudate, or preformed matrix based upon the type of reactor design selected (e.g., fluidized bed, fixed bed, catalytic converter, etc.)

The simplest iMeH catalyst is the iMeH powder itself. In this case the iMeH provides monatomic hydrogen and is the catalyst for hydroprocessing. The process and reactor hardware are more complex than in a fixed catalyst bed process.

The iMeH catalysts of the present invention, when used in powder form, may be mixed and dispersed within the feedstock and transported through a reactor (e.g. slurry reactor). After the desired reaction has been catalyzed in the reactor, the iMeH powder is then separated from the reaction products for reuse.

An iMeH can be combined with a support and optionally other catalytic elements to produce a composite catalyst. The support provides for the physical dispersion of iMeH, providing greater surface area and ease of handling. The support also serves to increase the surface area of the active catalytic elements and thereby increase the process reaction rates. The support also serves to disperse the metallic or metal oxide catalytic sites so as to prevent arcing in the presence of a strong electric or magnetic fields that may be used to expedite catalytic action.

The iMeH compounds of the present invention can be utilized in a crystalline or amorphous form. The support may be composed of an inorganic oxide, a metal, a carbon, or combinations of these materials. The iMeH phases and catalytic elements can be dispersed as mechanically mixed powders, or can be chemically dispersed, impregnated or deposited. When mixed powders are used in the present invention, the powder particle size is controlled to provide a powder that has particles that are small enough to provide suitable surface area and reactivity, but not so fine as to produce significant surface oxidation. In one embodiment, particles used in the catalyst of the present invention have diameters ranging from about 0.01 micrometers to about 1000 micrometers, from about 0.1 micrometers to about 100 micrometers, or from about 1 micrometer to about 10 micrometers. Nanosize powders and nanostructural elements containing an iMeH have also been found to be useful. The other catalytic elements may be known catalysts such as noble metals such as platinum or palladium, metal oxides, metal sulfides, and zeolite acid or base sites; these additional catalytic elements can further promote hydroprocessing. A hydroprocessing component and a hydrocracking component used in combination with the iMeH may be one or more of these catalytic elements. Both the combination of an iMeH powder with a support, which can provide an additional catalyst function (i.e. at catalytically active or inert support), or an iMeH dispersed onto a hydroprocessing catalytic powder, can be especially effective for hydrocracking in an FCC type of fluidized bed reactor.

The iMeH catalysts of the present invention can also be coated onto an extrudate, typically formed from a mixed metal oxide such as alumina or silica. This method has practical manufacturing advantages, provides a uniform coating, and yields a high iMeH surface area. The iMeH can be coated onto the spheres, pellets, rings, cylinders, and extrudates of other shapes, including 3-lobed and 4-lobed extrudates, of which commercial catalysts are typically formed. The iMeH catalysts can also be incorporated into the body of the extrudate. A powder of iMeH may be mixed with inert support powder, such as silica or alumina, or a commercial hydroprocessing catalyst, commercial hydrotreating catalyst or commercial hydrocracking catalyst ground to a fine powder. The mixed powder is combined with a binder and extruded. Fine powder large pore alumina coated with metal sulfides such as $CoMoS_x$, or zeolite powder coated with a noble metal such as palladium or platinum may also be combined with iMeH in this fashion.

The order of catalyst fabrication is based on minimizing exposure of the iMeH to oxygen or water vapor. It has been found that chemically coating a mixed metal oxide form, such as an extrudate, with iMeH has several manufacturing advantages, provides for a more uniform coating, and should yield the highest practical iMeH surface area.

In a typical process for the production of a catalyst of the present invention incorporating an extrudate, the raw inorganic oxides materials are extruded and calcined, the extrudate is chemically coated with hydroprocessing metals such as Ni/Mo or Pd and the resulting combination is calcined. Finally, the extrudate is chemically coated with an iMeH and treated with hydrogen.

The iMeH of the present invention can be combined by many means with existing hydroprocessing catalysts or components.

FIG. 1 depicts the process steps for the production of a catalyst of the present invention detailing the iMeH powder processing steps prior to mixing with the hydroprocessing catalyst powder. A metal alloy, of selected composition, is first exposed to hydrogen to produce an interstitial metal hydride structure. Based on available equipment, the iMeH is then reduced to powder form, under an inert or hydrogen atmosphere using any one of several conventional powder processing techniques known to those skilled in the arts. Alternatively, the metal alloy can first be made into a powder and then exposed to hydrogen to produce iMeH powder. The iMeH powder is then intimately mixed with a hydroprocessing catalyst powder and formed into a catalyst structure. The catalyst may take the form of an extrudate (including three-lobed and four-lobed forms), sphere, pellet, ring, cylinder, or other shapes, including a powder of particle size differing from the powder sizes of the starting powders. After forming, the iMeH is activated by exposure to hydrogen at temperature and pressure appropriate to the iMeH composition.

Figure 2:
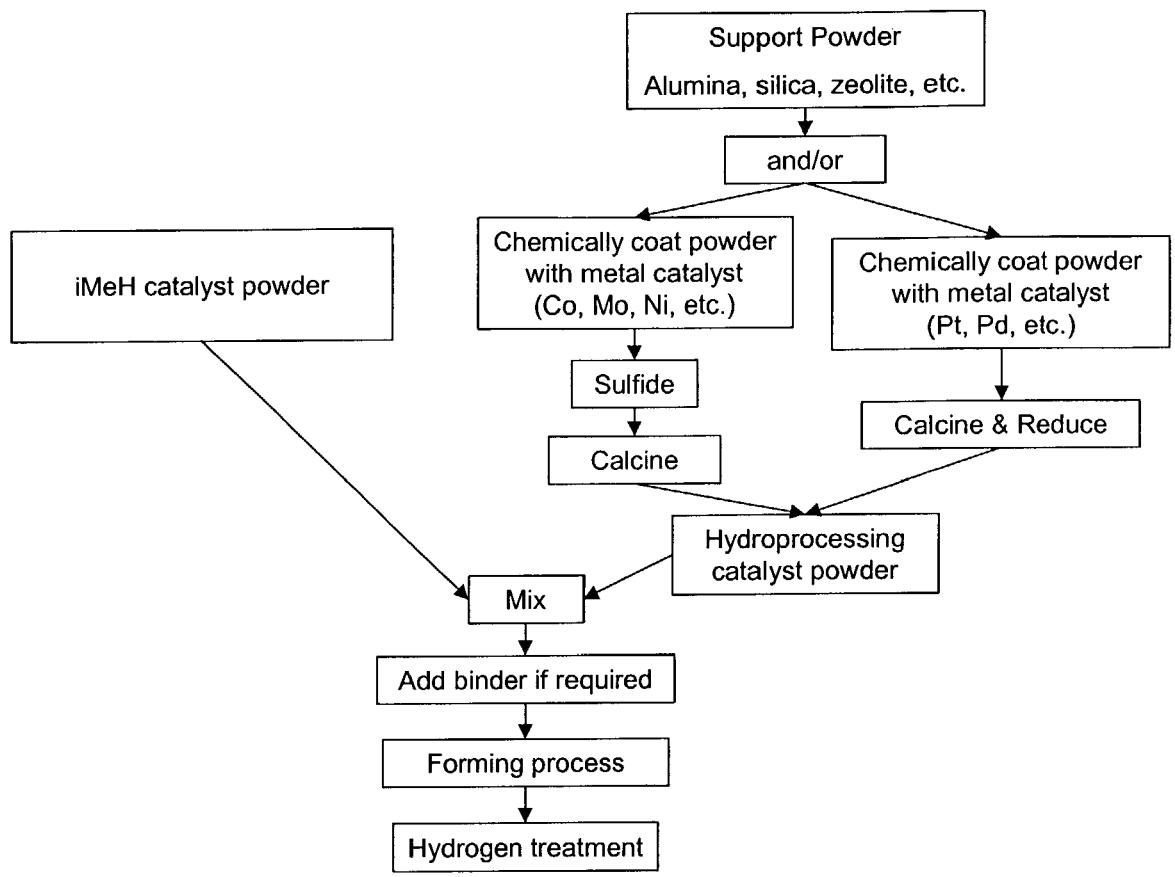
FIG. 2 is a diagram of a process for the production of a second catalyst of the present invention.

FIG. 2 depicts the process steps, as an example, in the production of a catalyst of the present invention in which an iMeH powder is mixed with a hydroprocessing catalyst powder. The hydroprocessing catalyst powder can be manufactured, by those skilled in the art, based upon process requirements. FIG. 2 shows several possibilities consisting of a support powder (such as a zeolite) coated with a noble metal catalyst and/or a metal sulfide such as $NiMoS_x$.

Figure 3:
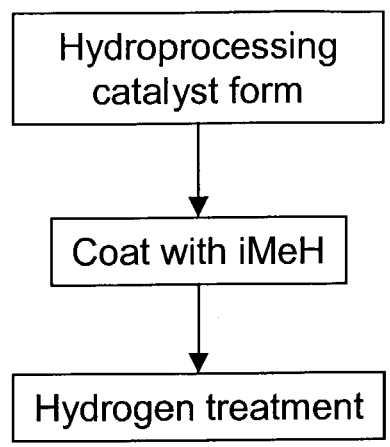
FIG. 3 is a diagram of a process for the production of a third catalyst of the present invention.

FIG. 3 depicts the process steps in the production of a catalyst of the present invention in which an iMeH is coated on a hydroprocessing catalyst form. The hydroprocessing catalyst form can be manufactured, by those skilled in the art, based upon process requirements. The iMeH coating can be produced by methods including, but not limited to, chemical vapor deposition (CVD), chemical coating, ion implanting, and sputtering. Hydrotreating catalyst or hydrocracking catalyst may be substituted for the hydroprocessing catalyst.

Figure 4:
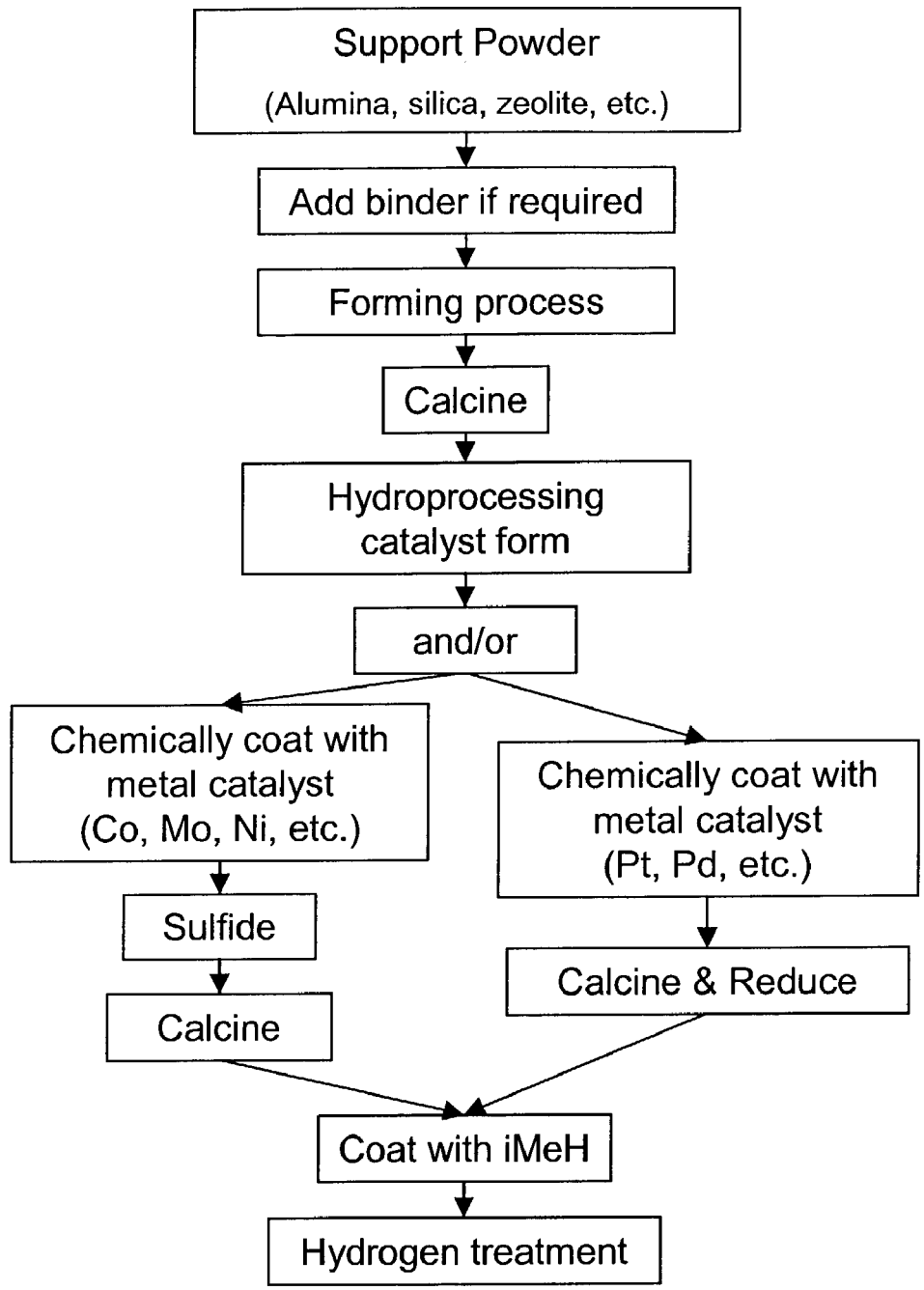
FIG. 4 is a diagram of a process for the production of a fourth catalyst of the present invention.

FIG. 4 depicts the process steps in the production of a catalyst detailing but not limiting the present invention in which an iMeH is coated on a hydroprocessing catalyst form. The hydroprocessing catalyst form can be manufactured, by those skilled in the art, based upon process requirements. FIG. 4 elaborates several possibilities consisting of a support form coated with a noble metal catalyst and/or a metal sulfide such as $NiMoS_x$.

Properties of the support such as porosity, pore size distribution, surface area and acidity are selected on the basis of the feedstock and the selected hydroprocess. For low molecular weight organic compounds, microporous supports are appropriate because they offer fine pore size and high surface area. For heavier organic compounds a larger pore meso and/or macroporous catalyst structure are required to allow the larger molecular size organic compounds to enter. The acidity can be adjusted to a level suitable for the particular process being catalyzed.

The iMeH can be combined with or placed in proximity to one or more additional catalytic elements or components, such as a cracking catalyst or a hydroprocessing catalyst. This combination reduces the severity of the conditions required for hydroprocessing. Pd, Ni/Mo, W, and Co/Mo catalysts are examples of materials that can function as these additional catalytic elements or components. The support function and additional catalytic properties can be combined in a single substance. The iMeH may, if it is placed in close enough contact with the additional catalytic elements, supply them with monatomic hydrogen, thereby increasing their catalytic activity. The additional catalytic elements need not be capable of storing monatomic hydrogen in their matrix to exhibit increased catalytic activity through the donation of monatomic hydrogen from the iMeH.

Another means of increasing catalytic activity is by enhancement through the hydrogen spillover effect. Without intending to be limited by this description, the hydrogen spillover effect generally refers to the phenomenon when adsorbed hydrogen on the catalyst (metal) surface migrates to a nearby catalytic site, or into the interstitial volume of the support. The iMeH produces monatomic hydrogen, which may not be immediately reacted with, but not limited to, the organic compound feed. Noble metal catalysts such as palladium and platinum can assist the migration of the reactive monatomic hydrogen. These noble metals have been shown to be novel promoters in combination with iMeH thereby increasing the catalytic effect. This is thought to be due to the hydrogen spillover effect, which increases the effective catalyst surface area.

A specific example of such a combined catalyst contains zeolite, palladium and iMeH which can enhance hydrogenation reactions. iMeH in powder form has a lower surface area compared to chemically coated palladium on the zeolite support. The iMeH in powder form can be an order of magnitude larger in size than the palladium particles dispersed on the support. The catalytic reaction site is thought to be extended beyond the surface of the iMeH through the transport of the monatomic hydrogen by means of the palladium enhanced hydrogen spillover effect.

Monatomic hydrogen is a highly reactive species and will react with many species as well as with another hydrogen atom to form molecular hydrogen. Therefore, intimate contact between the iMeH and the feedstock being hydroprocessed has been found to be significant. For example, if an oxide layer exists on the iMeH surface, the monatomic hydrogen is likely to react within the oxide layer before it encounters and reacts with a feedstock molecule. The iMeH used in the present invention is essentially free from surface oxides; an iMeH having a significant oxide coating cannot supply any significant amounts of monatomic hydrogen to a chemical process occurring on the oxide coating. The extent of the zone in which monatomic hydrogen can be found near the iMeH surface changes with process conditions that affect the mobility and reactivity of the monatomic hydrogen. The surface of the catalyst of the present invention is kept essentially free of oxides by avoiding exposure of the catalytic surface to air, any other oxidizing agent or water vapor at elevated temperatures. For certain highly reactive catalysts of the present invention, contact with air, any other oxidizing agent or water vapor is avoided at ambient temperatures as well as elevated temperatures. Experimental results have confirmed that minimizing the amount of surface oxides present increases the activity of the catalyst of the present invention. For iMeH powders or dispersions, the finer the particle size, the thinner the surface oxide layer requirements. The surface oxide thickness should not exceed half the diameter of the iMeH particle, preferably being one quarter the diameter or less, optimally being one-tenth the diameter or less. As an example, with an iMeH particle, with a diameter of one micrometer, the oxide layer would optimally be 100 nm or less.

It has also been found that surface condition of the iMeH is related to the state of matter of feedstocks that can be catalyzed. It has been found that the catalysts of the present invention are able to process liquid feedstocks as well as gaseous feedstocks.

The present invention has been found to be particularly useful in the hydroprocessing of organic compounds at lower pressures than conventional catalysts for a particular process.

According to the present invention, iMeH catalysts have been found to be of particular utility in catalyzing reactions involving the addition or rearrangement of hydrogen atoms in chemical species. It is expected that the catalyst of the present invention will catalyze reactions of inorganic materials in which hydrogen is involved. In particular, the cracking and hydroprocessing of petrochemicals is expedited by iMeH catalysts. Organic compounds are defined as compounds of carbon. Other elements that may be included in organic compounds include hydrogen, oxygen, nitrogen, sulfur, phosphorus, halogens, and metals. Classes of organic compounds include aliphatic compounds, including straight chain and cyclic alkanes, olefins, and acetylenes, aromatic compounds, including polycyclic structures, oxygen bearing compounds, including alcohols, ethers, aldehydes, ketones, carboxylic acids, esters, glycerides, and carbohydrates, nitrogen bearing compounds, including amines, amides, pyrroles, and porphyrins, sulfur bearing compounds, including thiols, sulfides, and thiophenes, phosphorus bearing compounds, including phosphate esters, organo-metallic compounds, and compounds with halogens, such as fluorine and chlorine. The following terms are used in the description of processes in which the present invention can be practiced:

Hydroprocessing—General term used to describe all catalytic processes involving hydrogen. Includes the reaction of any petroleum fraction with hydrogen in the presence of a catalyst. Examples include hydrocracking, hydrotreating and hydrodesulfurization.

Hydrocracking—A process used to convert heavier feedstocks into lower-boiling, higher-value products. The process employs high pressure, high temperature, a catalyst, and hydrogen. Typically 50% or more of the feed is reduced in molecular size.

Dewaxing—The process of removing waxes from a processed oil stream in order to improve low temperature properties. Waxes are high molecular weight saturated hydrocarbons or paraffins, typically those that are solids at room temperature. Dewaxing can be accomplished by solvent separation, chilling and filtering. The catalytic dewaxing process uses one or two zeolite catalysts to selectively hydrocrack the waxes into lower molecular weight materials.

Catalytic Dewaxing—A catalytic hydrocracking process which uses molecular sieves to selectively hydrocrack the waxes present into hydrocarbon fractions. This process is also referred to as hydrodewaxing.

Hydrotreating—Processes which remove undesirable impurities such as sulfur, nitrogen, metals, and unsaturated compounds in the presence of hydrogen and a catalyst. In contrast with hydrocracking, essentially none of the feed is reduced in molecular size in hydrotreating.

Hydrodenitrogenation—A hydrotreating process in which the nitrogen species which are present in heavier distillates are removed.

Hydrodemetalization (HDM)—A hydrotreating process in which metal species, typically nickel and vanadium, which are present in heavier distillates are removed.

Hydrodesulfurization (HDS)—A catalytic process in which the principal purpose is to remove sulfur from petroleum fractions in the presence of hydrogen.

Feedstock—Petroleum fraction subjected to a treatment process, including hydroprocessing and cracking.

Cracking—The conversion of feedstocks into lighter products.

Conventional catalysts show increased activity with increased temperature, and are generally subjected to thermally-conducted conventional heating to increase temperatures. Selected catalysts can also be heated dielectrically. Dielectric heating refers to a broad range of electromagnetic heating, either magnetically or electric field coupled, and includes radio frequency (RF) heating and microwave heating. It has been found that the value added for the process is maximized by using a minimum of dielectrically coupled energy, and by using conventional heat to supplement the total process energy. In a preferred embodiment of the present invention, microwave or RF energy is used in conjunction with fuel-fired heating or resistive heating. The exclusive use of microwave heating or RF heating, in the absence of fuel-fired heating or resistive heating, is not an economically viable process. In the present process, the primary effect provided by microwave and RF energy is the enhancement of the catalyzed chemical reaction, rather than the indirect effect of heating.

In a preferred embodiment of the present invention when used with microwave enhancement, the iMeH is in direct contact with a support; the iMeH functions as the primary microwave absorption material and no other microwave absorbing component is needed in the catalyst. If the iMeH is suitably dispersed, for example in a slurry comprising a feedstock and iMeH, it may be used in the absence of a separate support material.

The dielectric parameter called the loss tangent is known by those skilled in the art to measure the relative RF or microwave energy that a particular material absorbs at a given frequency. The loss tangent, also called the loss factor, is the ratio of the energy lost to the energy stored. A larger loss tangent for a material means that more energy is absorbed relative to a material with a lower loss tangent. The dielectric absorption of energy can cause different materials to heat at substantially different rates and to achieve considerably different temperatures within the same RF or microwave field.

The dielectrically absorbed energy can also directly contribute to the process energy balance. When used to drive an endothermic reaction, such as a cracking reaction, this means that if the absorbed RF or microwave energy equals the heat-of-reaction cracking energy, then there will not be a net increase in the bulk temperature for the process. However if more RF or microwave energy is absorbed than is necessary for the cracking reaction, or if there is a resulting exothermic reaction, e.g. hydrogenation from the release of monatomic hydrogen, then there will be a net increase in the bulk temperature.

In the preferred embodiment, for use with microwave and RF enhancement, the iMeH catalytic material is selected to have a higher loss factor than the catalyst support or other materials comprising the catalyst. In this preferred embodiment, the iMeH catalyst combines the two attributes of: 1) iMeH catalytically active sites and 2) iMeH material being the primary microwave and RF energy absorber due to its higher loss factor than other materials comprising the catalyst. This embodiment of the present invention has been found to produce higher reaction efficiencies than previously obtained.

In another embodiment of the invention, the iMeH is the primary absorber of microwave or RF energy, but one or more other secondary microwave absorbing components are present. In yet another embodiment of the invention, the iMeH is not the primary absorber of microwave or RF energy and does not have the highest loss factor, but the iMeH material is in direct thermal contact with materials that are the primary absorbers of microwave or RF energy and have higher loss factors.

Loss factors for the bulk iMeH catalyst of 0.30 or less, particularly 0.20 or less, such as 0.01 to 0.20, have been found to enhance reactions, while minimizing nonselective heating of the feedstock. This consideration for loss factor values maximizes the penetration depth of RF or microwaves, enabling the process of the present invention to be carried out on a large scale. In the preferred embodiment the loss factor for the iMeH, in combination with the support or bulk of the catalyst, is greater than that of the feedstock. Therefore the energy goes into catalyzing the reaction rather than the nonselective heating of the feedstock. The penetration depth is also a function of frequency.

The combined use of iMeH catalyst along with microwave or RF energy comprises two new process variables with which to optimize catalytic hydroprocessing. The iMeH serves as a high density source of interstitial monatomic reactive hydrogen. The application of microwave or RF energy provides a means of controlling the reaction of iMeH monatomic hydrogen with the feedstock. Also, proper application of microwave or RF energy promotes higher flux exchange of monatomic hydrogen from the matrix and further enhances the hydroprocessing reactions. This also controls and promotes the adsorption of molecular hydrogen to be dissociated into monatomic hydrogen. More specifically, the proper application includes control of the microwave or RF intensity or field strength, frequency, and making use of modulation techniques. Control of these parameters, in particular, using any number of modulation techniques known to those skilled in the art, for example amplitude modulation, frequency modulation and pulse width modulation, is of great utility to precisely control or to maximize the flux exchange of monatomic hydrogen from the iMeH to react with organic compounds.

Alternatively, the catalyst of the present invention may contain a separate microwave absorption material in combination with the iMeH. The support may be catalytically inactive or active. If the support is catalytically active, its activity may be enhanced by the production of monatomic hydrogen by the iMeH, with which the support is in close contact.

An iMeH catalyst used in combination with microwave energy can be configured in a variety of ways to produce a catalyst optimized for a particular reaction or function. If a more intimate mixture is desired, so that the iMcH and the support are in closer contact, finer powders, sub-micron or nano-particles, can be used; and would also increase catalytic surface area.

In the present invention, monatomic hydrogen, which can also be described as interstitial (dissociated) atomic-hydrogen radicals, from within the matrix of the iMeH is used for the hydrogenation of organic compounds and their derivatives. These dissociated monatomic hydrogen radicals are not covalently or ionically bound to metal atoms within the iMeH. The population of these free monatomic hydrogen radicals is generally in equilibrium between the interstitial hydrogen of the selected iMeH and its surface. This equilibrium is governed by factors of iMeH structure, temperature, pressure, and field strength of the radio frequency or microwave energy. The absorption of monatomic hydrogen by the crystal lattice of the iMeH is an exothermic reaction. The surface monatomic hydrogen radicals, in equilibrium with the interstitial matrix of the iMeH, may be directly reacted with organic compounds and their derivatives contacted at or near the surface of the iMeH. It is believed, without wishing to be bound by this characterization of the invention, that this hydrogenation happens because a localized high density of monatomic hydrogen radicals results in reactivity equivalent to or higher than that produced by non-localized high density of molecular hydrogen exerted by high hydrogen pressure. Hydrogen is more reactive with the C—C bond when it is in a radical monatomic form than when it is in the form of a diatomic molecule. Catalytic reactions involving an iMeH can provide a performance equivalent or better to that of a high-pressure zone of molecular hydrogen.

The processes of the present application, even though they may not result in an increase in the hydrogen content of the product, depend on hydrogen availability for two reasons: 1) hydrogen availability prevents poisoning of catalyst, and 2) hydrogen availability is a key factor permitting molecules to undergo rearrangement. Ideally, a molecule binding to an active catalytic site undergoes the desired reaction or rearrangement and leaves the catalytic surface. However, if there is a local deficiency of hydrogen, the molecule may polymerize, react with another active molecule, or deposit on the catalytic surface as coke; all three of these outcomes can reduce the number of available catalytic sites. In the absence of hydrogen, the catalyst becomes deactivated more rapidly and requires more frequent cycling. Because the catalyst of the present invention can provide hydrogen from its own structure as well as accommodate hydrogen from the reaction medium, problems of localized hydrogen deficiency are minimized. In addition, because of its ability to stabilize monatomic hydrogen, the catalyst of the present invention is able to promote reactions in which hydrogen atoms are added to the feedstock molecules.

Test results indicate that it is important to balance the hydrogenation with other catalytic functions such as cracking or desulfurization so as to minimize undesired reactions like coking. This balance is achieved by controlling the ratio of iMeH content and its respective surface area to the content and surface area of the support and other catalytic components.

The present invention has been also found to be particularly useful in the cracking or hydrocracking of heavy organic compounds. The dielectric properties of heavy organic compounds allow them to be selectively heated by RF and microwave heating. If they crack near the surface of the iMeH, then they will react with monatomic hydrogen and undergo hydrogenation, desulfurization, and other desired processes. The products of the cracking reaction have lower microwave loss factors than do the reactants, and are thus less subject to undergo RF and microwave heating than the reactants. The reactants are therefore selectively heated and selectively reacted, resulting in enhanced process efficiency.

Compositions of iMeH

The following are examples of catalyst compositions according to the present invention:

Cat 100
$AT_5$-Type
Crystal Structure: Hexagonal

General formula: $A_{1-x}M_xT_{5-y-z}B_yC_z$ x=0.0-1.0, y=0.0-2.5, z=0.0-0.5
A=Mm (mischmetal); T=Ni; M=La, Pr, Nd or Ce; B=Co; C=Mn, Al or Cr Cat 200
$A_2T_{14}B$-Type
Crystal Structure: Tetragonal General formula: $A_{2-x}M_xT_{14-y}C_yD_zB$ x=0.0-2.0, y=0.0-14, z=0.0-3.0
A=Nd or Pr; T=Fe; M=La, Pr, Nd or Ce; B=Boron; C=Co; D=Cr, Ni or Mn Cat 300
$A_2T$-Type
Crystal Structure: Monoclinic General formula: $A_{2-x}M_xT_{1-y}B_y$ x=0.0-0.5, y=0.0-0.5
A=Mg; T=Ni or Cu; M=La; B=Fe or Co Catalysts of the present invention may also contain combinations of these compositions.

Figure 5:
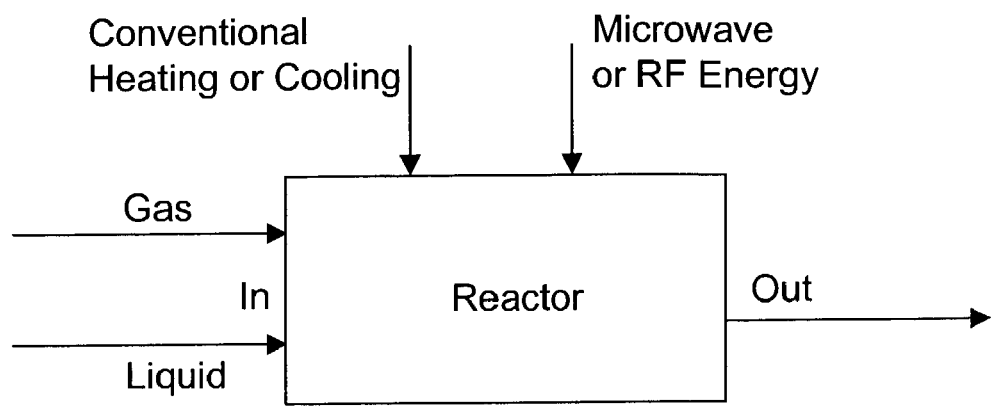
FIG. 5 is a schematic diagram of a reactor configuration for the process of the present invention.

The catalyst of the present invention may be used with all varieties of process reactor configurations, which are known to those skilled in the art. Generally common to these configurations are a reaction vessel designed to permit the introduction of gas and liquid, to contain the feedstock and the catalyst at a suitable pressure and temperature, and that accommodates the removal of product, as shown in FIG. 5. Alternatively either gas and/or liquid may be pre-heated, depending upon process conditions, as is common practice to those skilled in the art. The catalyst is introduced into the reaction vessel under conditions preventing the formation of surface oxides. Depending on the reactivity of the catalyst, exposure of the catalyst to oxygen or water vapor at high temperature may be avoided, or an inert atmosphere may be used to blanket the catalyst. The catalyst may take the form of a bed in the reaction vessel, or the catalyst and feedstock may be circulated so that they are in close contact with each other during processing, resulting in a catalyst-feedstock (catalyst-organic compound) mixture. It is known to those skilled in the art that other types of reactor catalyst beds are possible, e.g. fixed beds, moving beds, slurry reactors, fluidized beds. Preferably, provision is made for recirculating hydrogen during the catalytic process. Reaction occurs on introduction of feedstock and hydrogen gas on to catalyst within the reaction vessel. The feedstock (organic compounds) reacts with the monatomic hydrogen at the surface of the catalyst. Energy is applied to the catalyst, feedstock (organic compound), reaction mixture or the catalyst-feedstock (catalyst-organic compound) mixture; these may be heated by heat resulting from a chemical reaction such as combustion, by resistive heating or by acoustic heating, may be heated dielectrically by radio frequency or microwave energy, or they may be heated by a combination of these methods. Combustion is the chemical combination of a substance with oxygen. Resistive heating is heating resulting from the flow of a current through an electrical conductor. Acoustic heating is heating resulting from physical motion or vibration induced in a sample, with a sonic frequency of less than about 25 KHz, or an ultrasonic frequency greater than about 25 KHz, typically 40 KHz. Radio frequencies range from about $3 \times 10^5$ Hz to about $3 \times 10^8$ Hz; microwave frequencies range from about $3 \times 10^8$ Hz to about $3 \times 10^{12}$ Hz. Cooling mechanisms known to those skilled in the art may be combined with the reaction vessel to accommodate exothermic reactions (e.g. the introduction of quenching gases or liquids). The reaction products may be recovered upon their removal from the vessel. The feedstock (organic compounds) may be preheated before contact or in combination with the catalyst by heat resulting from a chemical reaction such as combustion, by resistive heating or by acoustic heating, or may be heated dielectrically by radio frequency or microwave energy.

The catalyst of the present invention may be used with all varieties of processes that are known to those skilled in the art. Typical process conditions include temperatures of at least about 150° C., more particularly, at least about 225° C., and even more particularly, at least about 300° C. Generally, the methods are carried out at temperatures less than about 600° C., more particularly, less than about 550° C., and even more particularly, less than about 450° C. The pressure at which the methods may be practiced are generally at least ambient pressure (14.7 psia), more particularly, at least about positive 25 psig, and even more particularly, at least about positive 50 psig. Typically, the pressure is less than about positive 600 psig, more particularly, less than a positive pressure of about 450 psig, and even more particularly, less than a positive pressure of about 300 psig. RF or microwave energy at a frequency greater than or equal to about 1 MHz, and more particularly, at least about 500 MHz may generally be applied. RF or microwave energy at a frequency less than about 10,000 MHz, and more particularly less than about 3,000 MHz, of RF or microwave energy may be generally applied. The liquid hourly space velocity (LHSV) defines the feedstock to catalyst ratio. LHSV is the liquid hourly space velocity defined as the ratio of the volume of feedstock to the volume of catalyst that passes through the catalyst on an hourly basis. The LHSV range is generally at least about 0.10 per hour, and more particularly at least about 0.20 per hour, and even more particularly about 0.30 per hour. The LHSV tends to be less than about 10 per hour, and more specifically, less than about 5 per hour, and even more specifically, less than about 3 per hour.

Batch process reactors accommodating the catalyst and process of the present invention operate at elevated temperature and pressure. The batch process may have means to heat and/or cool the reactor, add and remove catalyst, receive feedstock and gas, and remove product and gas. Preferred configurations include a means to stir or recirculate the gas, catalyst and feedstock, a means to recharge the catalyst, and a means to provide RF or microwaves to the reaction site.

The preferred embodiment is a continuous flow process. Continuous flow reactors accommodating the catalyst and process of the present invention operate at elevated temperature and pressure. They may contain means to heat and/or cool the reactor, add and remove catalyst, receive feedstock and gas, preheat feedstock and gas, and remove product and gas. Preferred configurations include a means to stir or recirculate the gas, catalyst and feedstock, a means to recharge the catalyst, and a means to provide RF or microwaves to the reaction site.

Figure 6:
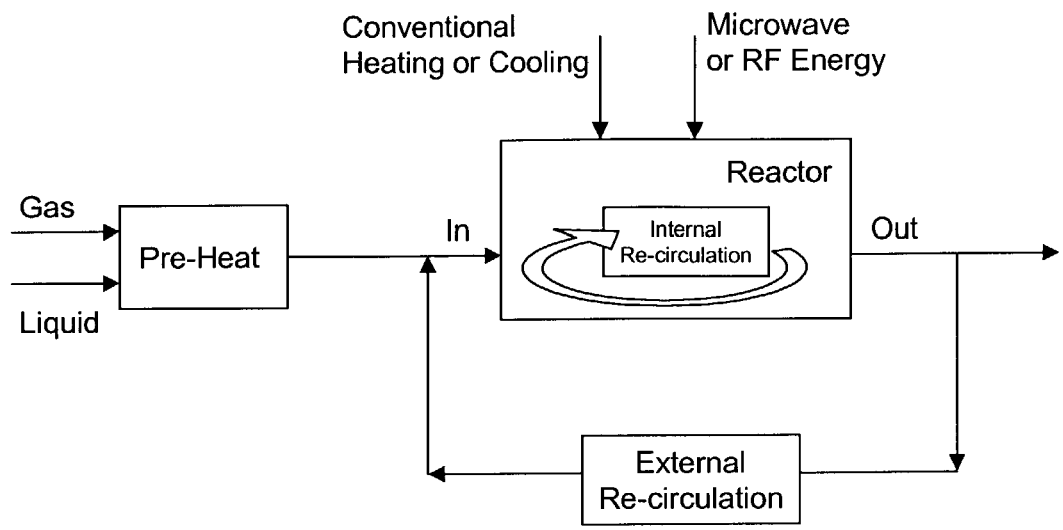
FIG. 6 is a schematic diagram of a reactor configuration for the process of the present invention with the capability of preheating the gas and liquid and recirculating the reaction mixture or components of the reaction mixture internally and externally.
Figure 7:
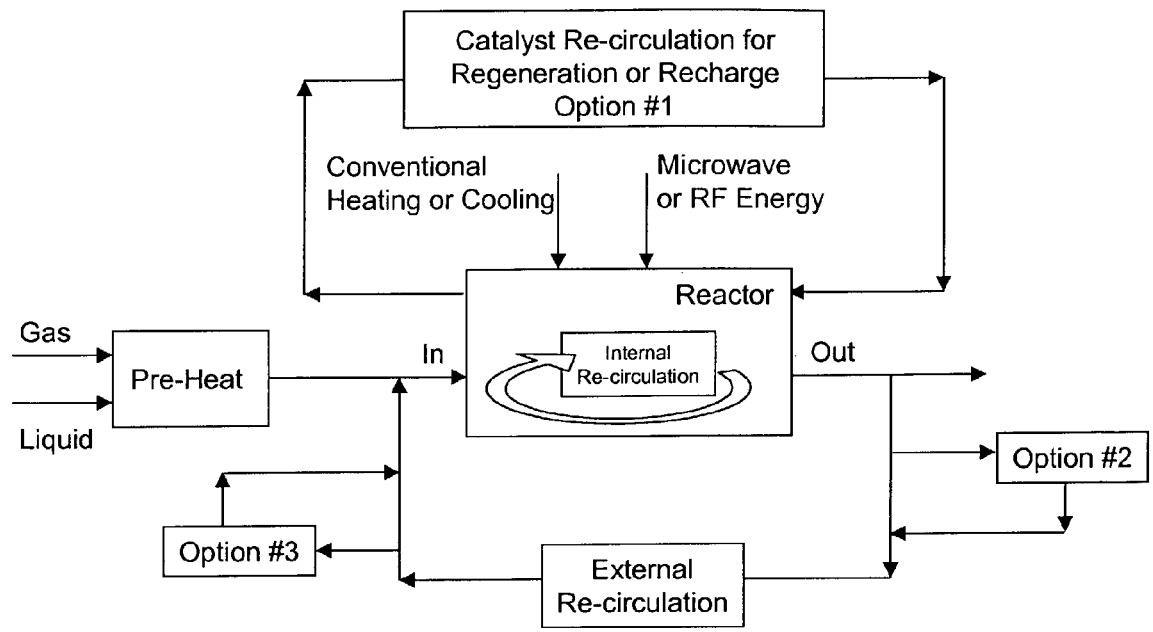
FIG. 7 is a schematic diagram of a reactor configuration for the process of the present invention having the capability of recirculating the catalyst for regeneration or recharging.
Figure 8:
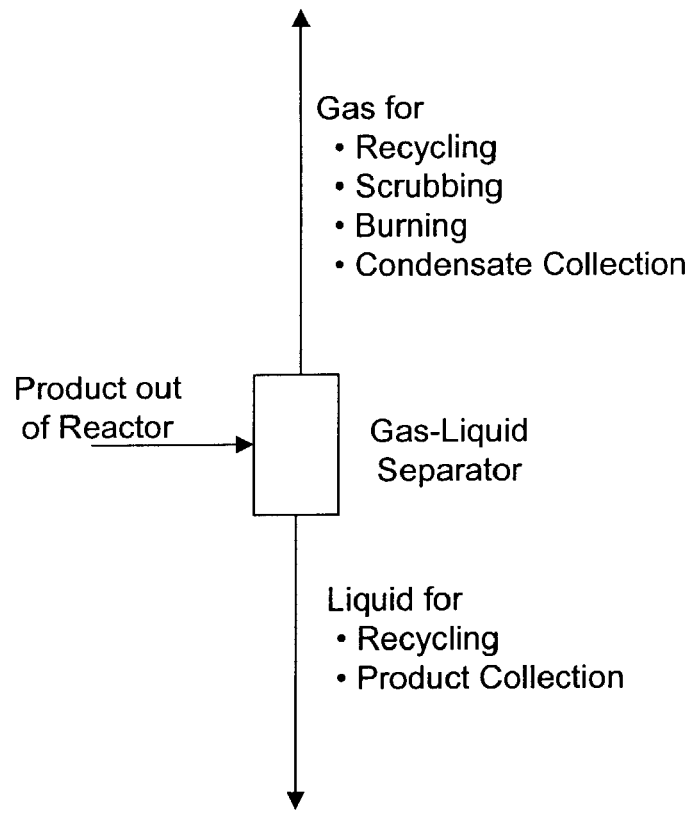
FIG. 8 is a schematic diagram for improved handling the output for any reactor design for the process of the present invention having the capability of separating product into gas and liquid.

Recirculation capabilities add to the utility of reactors used in the present invention. FIG. 6 depicts the use of a reactor with the capability of preheating the gas and liquid and recirculating the reaction mixture or components of the reaction mixture internally and externally. FIG. 7 depicts the use of a reactor with the capability of recirculating the reaction mixture or components of the reaction mixture internally and externally, as well as the capability of recirculating the catalyst for regeneration or recharging. The catalyst recirculation loop for regeneration or recharge can stand alone as seen in option 1 or be combined with existing loops as seen in options 2 or 3. FIG. 8 depicts improved handling of the output for any reactor design of the process for the present invention having the capability of separating product into gas and liquid. The option shown in FIG. 8 can be used with any of the reactors shown in FIGS. 5, 6, and 7. FIG. 9 depicts improved handling of the output for any reactor design of the process for the present invention having the capability of gas product collection, gas product recycling, liquid product collection and liquid product recycling and a means for injecting the gas and liquid to be recycled and injected back into the feed or input stream. The option shown in FIG. 9 can be used with any of the reactors shown in FIGS. 5, 6, and 7.

EXAMPLE 1

Logarithmic Pressure Composition Isotherms of an iMeH Catalyst

Figure 10:
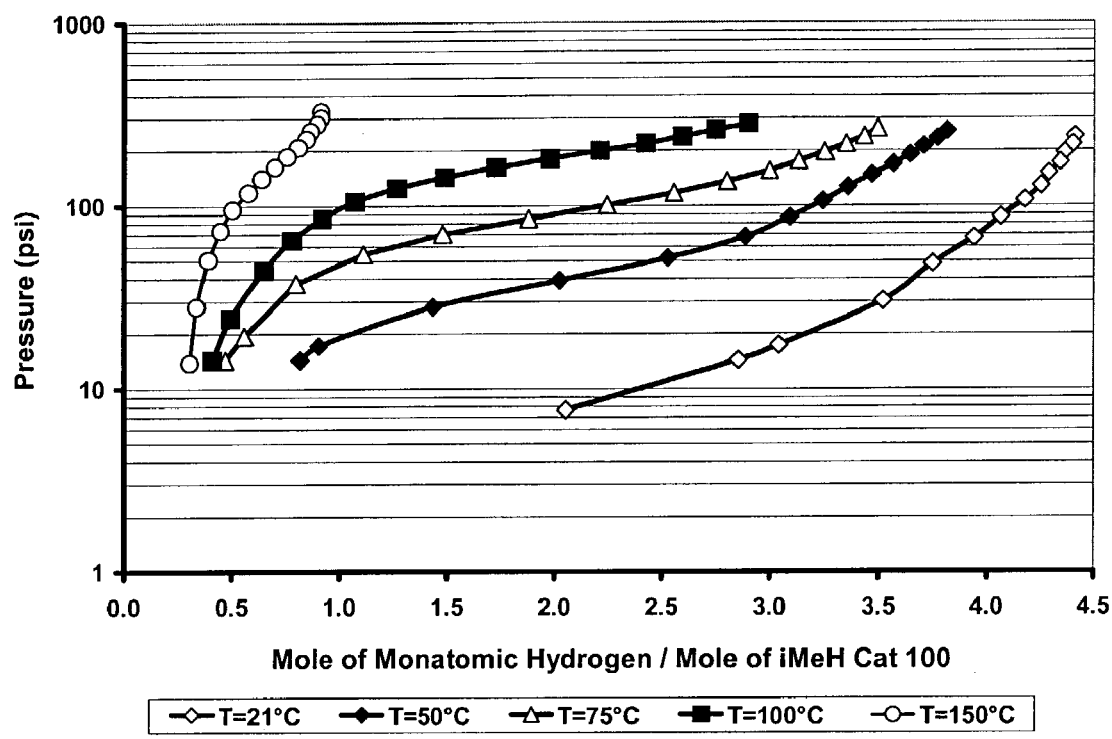
FIG. 10 is a plot of hydrogen pressure versus hydrogen content at various temperatures for a catalyst of the present invention.

FIG. 10 shows the logarithmic pressure composition isotherms for the monatomic hydrogen desorption curve of iMeH Cat 100, $Mm_{(1.1)}Ni_{(4.22)}Co_{(0.42)}Al_{(0.5)}Mn_{(0.15)}$. The plot displays the results at constant temperatures and equilibrium conditions for Cat 100 powder, relating pressure and stored iMeH hydrogen density. The plot shows that at a constant temperature, the iMeH hydrogen density increases as a non-linear function of pressure. The plot also shows that decreasing the temperature of the isotherms results in an increase of the iMeH hydrogen density. This data characterizes the iMeH catalyst's hydrogen capacity to provide monatomic hydrogen for hydrogenation or hydroprocessing reactions.

EXAMPLE 2

Selection of an iMeH Catalyst

To select an iMeH for a catalytic process, and to determine the operating parameters, it is useful to know how much hydrogen an iMeH material stores, the temperature at which the monatomic hydrogen desorbs, and the effect of pressure on monatomic hydrogen desorption.

Figure 11:
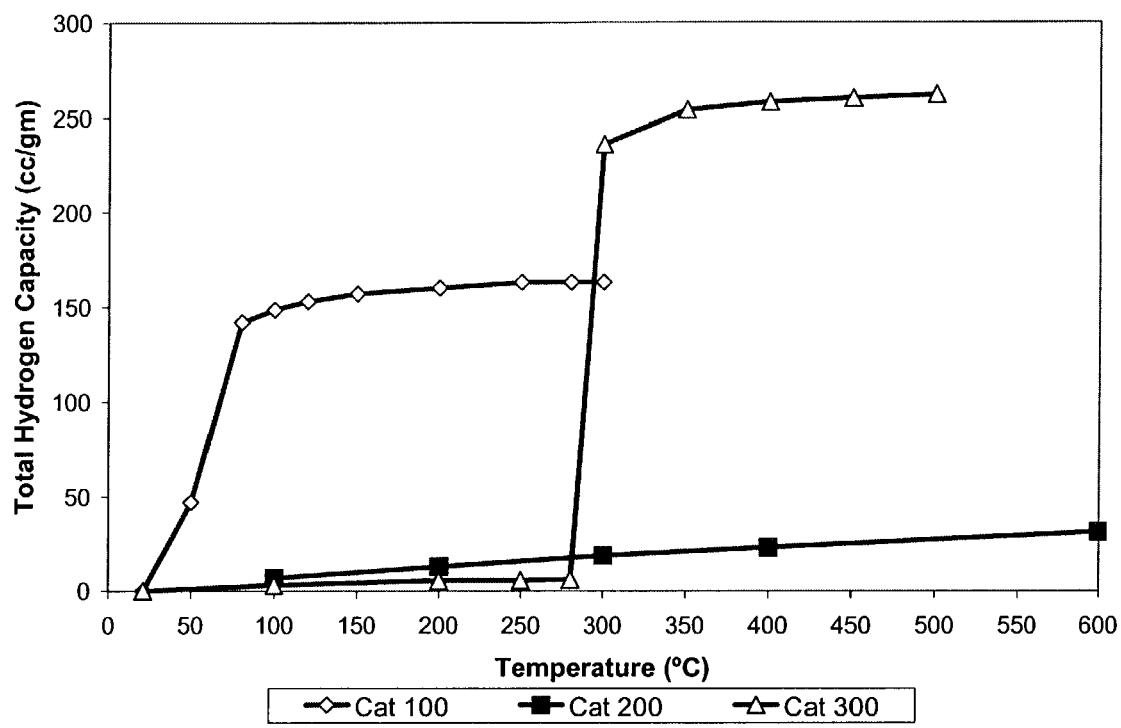
FIG. 11 is a plot of total hydrogen versus temperatures at ambient pressure for three catalysts of the present invention.

In FIG. 11, plots of total hydrogen capacity versus temperature at ambient pressure are shown for Cat 100, Cat 200 and Cat 300, three example catalysts of the present invention. The compositions of these examples of iMeH catalysts according to the present invention are as follows:

Cat 100

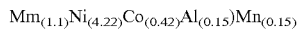
$Mm_{(1.1)}Ni_{(4.22)}Co_{(0.42)}Al_{(0.15)}Mn_{(0.15)}$

Cat 200

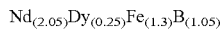
$Nd_{(2.05)}Dy_{(0.25)}Fe_{(1.3)}B_{(1.05)}$

Cat 300

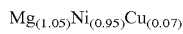
$Mg_{(1.05)}Ni_{(0.95)}Cu_{(0.07)}$

Given the standard industrial tolerances in the production of metals it is expected that very similar properties will be exhibited by a composition with the following general formulas:

Cat 100

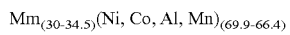
$Mm_{(30-34.5)}(Ni, Co, Al, Mn)_{(69.9-66.4)}$

Cat 200

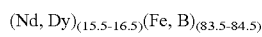
$(Nd, Dy)_{(15.5-16.5)}(Fe, B)_{(83.5-84.5)}$

Cat 300

$Mg_{(44-46)}(Ni, Cu)_{(54-56)}$

Monatomic hydrogen desorbs from Cat 100 at lower temperatures, below 200° C. while monatomic hydrogen desorbs from Cat 300 at temperatures above 250° C. Also, the transition for desorption for Cat 300 is sharper. Thus, for a reaction at ambient pressure, one would select Cat 100 for a low temperature reaction below 200° C. and Cat 300 for a higher temperature reaction above 300° C. Cat 200, while it has a lower total hydrogen capacity, has the property of desorbing monatomic hydrogen over an extended temperature range.

When the pressure is adjusted, the operating temperature that optimizes the release of monatomic hydrogen is changed. Table 1 shows that at a given temperature, less monatomic hydrogen is released as the operating pressure increases. Therefore, selection of iMeH depends upon both process temperature and pressure. The hydrogenation performance of the iMeH can be controlled by the operating parameters so that, in this example, the low temperature iMeH can be used at higher temperatures by increasing the process pressure, within its thermodynamic limit.

EXAMPLE 3

Microwave Enhanced Hydroprocessing with Respect to Feedstock

Figure 12:
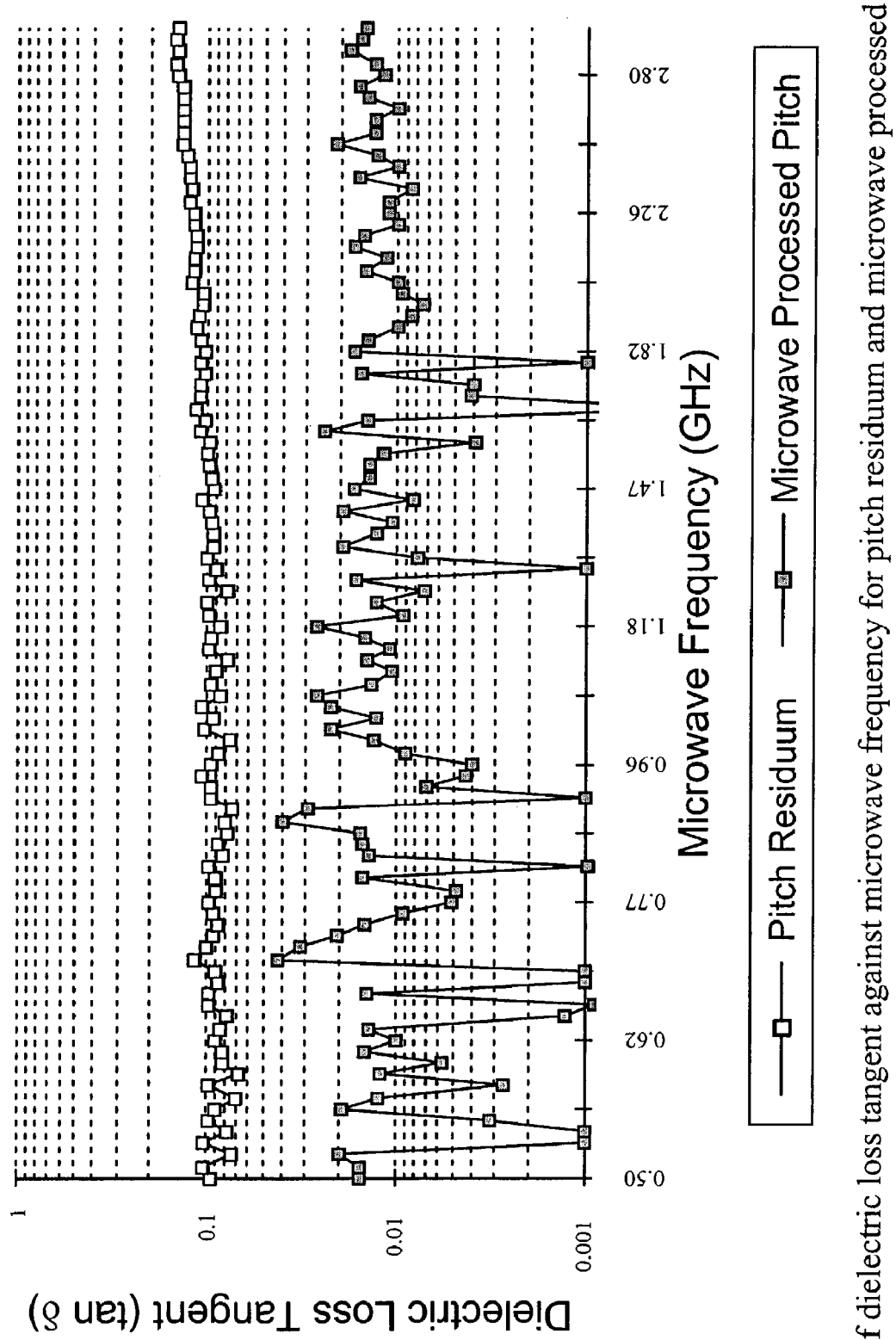
FIG. 12 is a plot of dielectric loss tangent against microwave frequency for pitch residuum and microwave processed pitch.

For heavy oils, such as pitch residuum, microwave energy is preferentially absorbed by the aromatic and polar compounds in the oil thereby promoting their reaction. This is shown in FIG. 12 where the loss tangent (y-axis) for pitch residuum is approximately an order of magnitude greater than for microwave processed pitch (reduced molecular weight and lower boiling point) across a wide range of microwave frequencies (0.5-2.8 GHz). The loss tangent, also called loss factor or the dissipation factor, is a measure of the material's microwave adsorption. The loss tangent is also the ratio of the energy lost to the energy stored.

In hydroprocessing according to the present invention, the proper control and use of the dielectric loss tangent leads to the efficient use of microwave energy. The fraction of microwave energy, which is absorbed by any component of the oil and catalyst mixture, can be efficiently controlled. For example, when the dielectric loss tangent of the catalyst is equal to the oil, then approximately half the microwave energy initially goes into heating the oil and half into the catalyst. The primary method of loss tangent control is by adjusting the material compositions of the individual components. This includes the optimization of catalyst composition or the blending of feedstocks.

Figure 13:
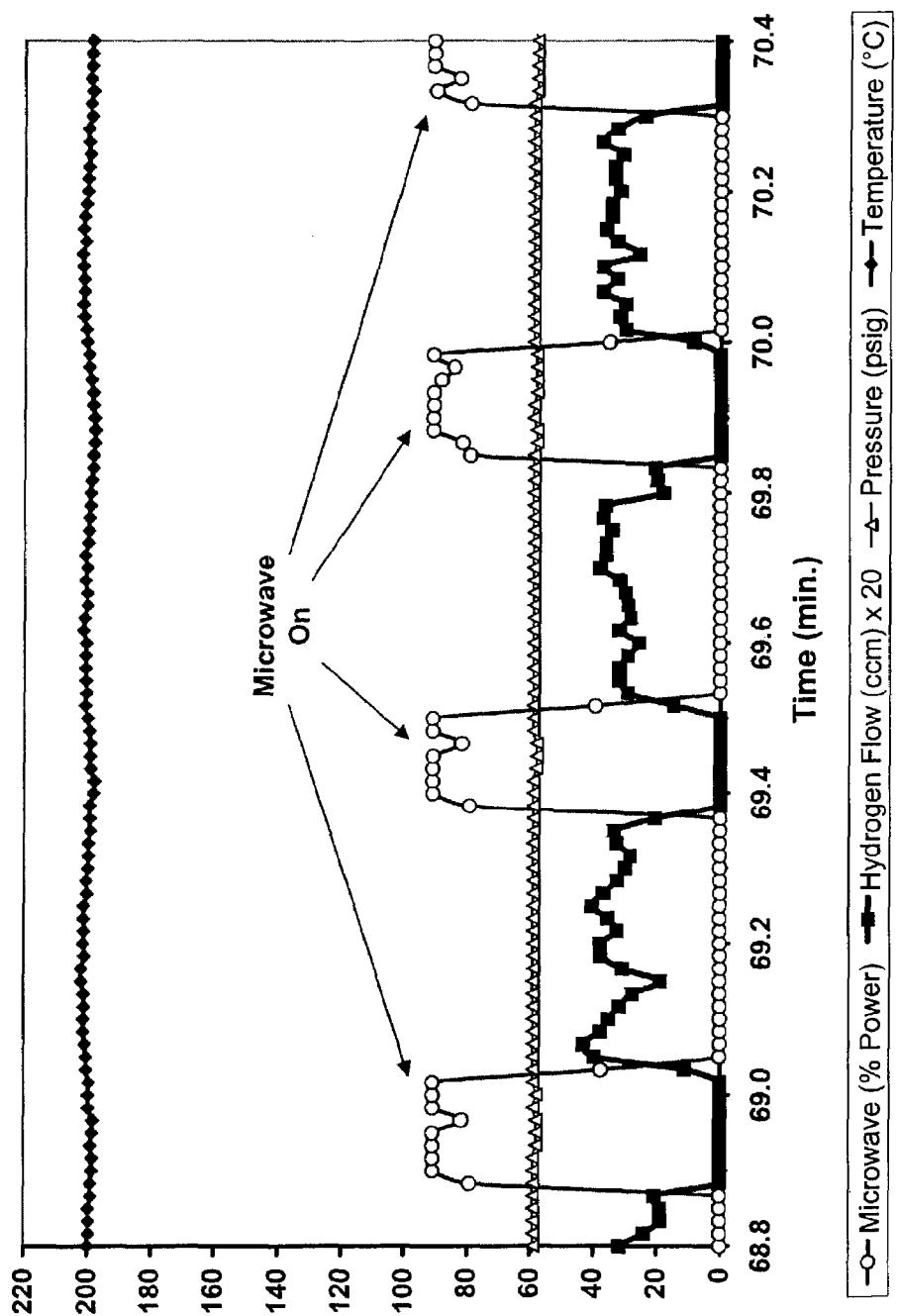
FIG. 13 is a graph of pressure, temperature, microwave power and hydrogen flow as a function of time for a reaction catalyzed by the iMeH Cat 300 with palladium coated USY support.

In the case where increased hydrogenation is desirable, hydrogenation can be enhanced by increasing the loss tangent of the iMeH catalyst component relative to that of the oil. For heavy oils, as the oil is reacted from residuum to cracked oil, on a local scale, more of the microwave energy, as further explained in example 5 and shown in FIG. 13, is available to go into the catalyst, further promoting hydrogenation enhancement, in comparison to thermal heating of the oil.

When lighter oil is being hydrogenated, the oil itself would already have a lower loss tangent. In this case the catalyst can be adjusted to maintain a high fixed loss tangent ratio of the catalyst to the oil. Microwave energy can thereby be efficiently directed to promote hydrogenation by the coupling into the hydrogenation components of the catalyst.

Methods for adjusting the catalyst loss tangent include, but are not limited to, controlling iMeH dispersion, iMeH concentration, and selection of iMeH alloy type or composition and/or type. Similar modification to the support structure can be made as well as doping and coating with selected materials.

Similarly hydrocracking can be controlled through the adjustment of the dielectric properties of the catalyst. Microwave energy can be efficiently directed to promote cracking by the coupling into the hydrocracking components of the catalyst.

EXAMPLE 4

Evaluation of Microwave Assisted Processing of Heavy Petroleum Fractions

The feed samples used for this example were pitch residuum, heavy residue left after straight run atmospheric distillation in the production of gasoline and diesel fuels. The samples were processed, using microwave energy at 2.45 GHz, slightly below ambient pressures under a blanket of nitrogen. Several types of commercially available zeolites were used as catalysts: 5A, 13X, and ammonium Y. Spot checks of the bulk temperature of the catalyst/pitch mixture were conducted using a type K thermocouple. Temperatures ranged from about 200° C. to 475° C. Temperature checks were conducted as rapidly as possible after the microwave power was turned off, typically within five to ten seconds, to minimize cooling of the sample.

These tests show the effect of using only a simple catalyst without the addition of iMeH catalyst. The properties of the feed (pitch residuum) and the product (microwave processed pitch) are shown in Table 2. Microwave processing of the feed reduced the pour point reduced from 95 to 30 and the viscosity was lowered from 413 cSt at 100° C. to 7 cSt at 50° C. Additionally, the simulated distillation results show that the boiling point distribution has significantly shifted from mostly high boiling organic compounds, in the pitch feed, to lower boiling organic compounds in the product. Little change was observed in either the specific gravity or in the concentration of sulfur. This indicates that without the use of an improved catalyst, the product was produced via cracking reactions. There was little desulfurization or addition of hydrogen.

In another series of tests the pitch was microwave processed with and without iMeH catalyst in a microwave oven to evaluate the effect of the iMeH catalyst component while using the pitch feedstock. Tests were performed with the following catalyst mixtures; 1) commercial 13X zeolite, 2) a mixture of commercially available 13X zeolite and ammonia-Y catalyst, and 3) a mixture commercial sodium-Y catalyst with iMeH Cat 100. As before, the samples were processed slightly below ambient pressures under a blanket of nitrogen at an approximate temperature of 250° C. Lead acetate paper was positioned near the reaction vessel outlet to determine the presence hydrogen sulfide ($H_2S$).

Only the tests using catalyst with the iMeH Cat 100 component rapidly turned the lead acetate paper black, indicating that large quantities of hydrogen sulfide were being produced and the product was being desulfurized. No $H_2S$ was detected during tests conducted with catalysts without the iMeH Cat 100 component.

The stored monatomic hydrogen within the iMeH catalyst was the only source of free hydrogen. These tests show that the iMeH catalyst component, with the enhancement of the microwave energy, assists the catalytic hydrogenation and release of $H_2S$ to promote desulfurization. These tests show that microwave energy and iMeH catalyst promote hydrogenation and hydroprocessing at low pressure.

EXAMPLE 5

Description of Microwave Enhanced Hydrogenation with Respect to iMeH Catalyst

FIG. 13 depicts measurements obtained in a batch reactor test. In this test, 30 cc of iMeH catalyst (50% Cat 300/50% USY (1% Pd) was placed in a reactor with 30 cc of coker-kero feed. This feedstock has both sulfur and aromatic components. The reactor pressure, microwave power at 2.45 GHz, and the iMeH catalyst bulk temperature were monitored along with the $H_2$ flow rate into the reactor. The initial pressure was set at 50 psig. Upon heating to 200° C. the pressure increased to 60 psig where it was maintained throughout the test.

FIG. 13 shows that, when the microwaves are applied into the reactor, the flow of gaseous molecular hydrogen ($H_2$) into the reactor is zero. For this example of feedstock, catalyst, temperature, and low pressure, hydrogenation occurs only when monatomic hydrogen (H.) is reacted into the coker-kero feedstock through the effects of both the iMeH catalyst and the microwaves. The data shows that the pressure remains either constant or is slightly reduced during the time when the microwaves are on. Hydrogenation occurs when the microwave field simultaneously stimulates the iMeH and causes the direct reaction of the monatomic hydrogen (H.), from within the interstitial lattice of the iMeH, to catalyze and combine with the coker-kero hydrocarbons and sulfur compounds comprising the feedstock. This direct catalytic reaction however temporarily depletes the monatomic hydrogen (H.) from within the interstitial lattice of the iMeH.

When the microwaves are not being applied into the reactor, the gaseous hydrogen ($H_2$) flows into the reactor to replenish the hydrogen consumed by the monatomic (H.) hydrogenation reactions. When the gaseous hydrogen contacts the surface of the iMeH, it is dissociated into monatomic hydrogen (H.) by the fundamental nature of the iMeH and is absorbed into the interstitial structure of the iMeH. There is a useful, but reduced, catalytic effect when using iMeH without the benefit of microwaves. In the case without microwaves, an equilibrium exchange is reached whereby the rate of gaseous hydrogen ($H_2$) into the iMeH is in balance with the rate of monatomic hydrogen (H.) reacted into the feedstock. However the equilibrium rate of monatomic hydrogen (H.) reacted into the feedstock is typically lower without microwaves. Using the hydrogenation of naphthalene as an example, microwaves tripled the production of decalin and increased hydrogen uptake by 62% to 6.5 wt %, as shown in Tables 4 and 7, Example 6.

EXAMPLE 6

Quantitative Hydrogenation Test Results for Naphthalene

A sequence of tests was conducted on naphthalene ($C_{10}H_8$) as a model compound to demonstrate the hydrogenation capability of the iMeH catalysts and the effect of microwave enhancement of the hydrogenation reactions catalyzed by iMeH. Shown in this example are tests conducted under identical temperature and pressure (200° C. and 50 psi $H_2$) and the same liquid hourly space velocity (LHSV) setting of 0.5. The microwave frequency was 2.45 GHz.

The feed naphthalene solution was prepared with n-dodecane (n-$C_{12}H_{26}$) as solvent, and n-nonane (n-$C_9H_{2}O$) as an internal standard. Major hydrogenation products include tetralin ($C_{10}H_{12}$) and cis- and trans-decalin ($C_{10}H_{18}$). The formation of tetralin requires the addition of four hydrogen atoms per molecule, while the formation of decalin needs the addition of 10 hydrogen atoms. Decalin is the fully-saturated reaction product for the hydrogenation of naphthalene. The yield of tetralin and decalin is a measure of the extent of naphthalene hydrogenation, as shown through the following reactions:

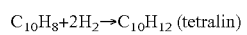
$C_{10}H_8 + 2H_2 \rightarrow C_{10}H_{12}$ (tetralin)

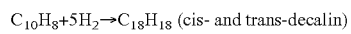
$C_{10}H_8 + 5H_2 \rightarrow C_{18}H_{18}$ (cis- and trans-decalin)

After a test, the product gas phase and liquid phase were analyzed with gas chromatographs (GC) to determine their chemical makeup. The GC results allowed for quantitative determination of the concentration of naphthalene remaining in the product and the amounts of tetralin and cis and trans decalin produced. A mass balance was performed for each test. The change in hydrogen content was calculated by subtracting the hydrogen in feed from the hydrogen in product.

The following test results show that the iMeH catalyst has a large hydrogenation capacity, even at significantly lower pressure (200° C., 50 psi). Such capacity is significantly enhanced with the application of microwave energy.

Test results provide evidence of the advantages of using interstitial metal hydrides (iMeH) with and without microwave energy. Data for three distinct classes of iMeH catalysts are presented, Cat 100, Cat 200, and Cat 300. The iMeH component is mixed with a commercial ultra-stabilized Y (USY) zeolite powder with a silica to alumina ratio of 80. The USY powder was tested as is or chemically coated with 1 wt % palladium (Pd). All catalysts were tested in pellet form.

The combinations of support and iMeH catalyst combination are not optimized, and do not limit the use of iMeH with other supports for other hydrogenation examples (ZSM-5, $ZrO_2$, silica, alumina).

Other catalytic materials tested included a commercial H-Oil catalyst and hydride materials prepared by conventional methods.

The iMeH powder was mixed with Pd coated or uncoated USY powder at two composition levels (30 wt %, 50 wt %).

The test results in tabular form displayed by the product hydrogen uptake and the weight percent of decalin produced, normalized to the total conversion of naphthalene feed.

Three tests are presented in Table 3. They compare three catalyst compositions used for naphthalene hydrogenation tests. These tests were processed using conventional heat at the process conditions of 200° C., 50 psig, 0.5 LHSV. The first catalyst, 100% USY is a zeolite support is shown to be ineffective at hydrogenating naphthalene at these process conditions. The second catalyst was made by the addition chemically dispersed palladium, 1 wt % Pd, to the USY support, by techniques known to those skilled in the art. Palladium is known a hydrogenation catalyst, but this naphthalene hydrogenation reaction is generally performed at pressures exceeding 1000 psi. This catalyst allowed for production of tetralin yielding a hydrogen uptake of 1.6%. The last catalyst was made by mixing 30 wt % of iMeH Cat 100 power together with USY powder. This catalyst resulted in a hydrogen uptake of 1.9% demonstrating that the iMeH Cat 100 is an effective hydrogenation substitute for palladium.

Naphthalene Hydrogenation Tests Comparing Catalyst with iMeH Cat 100 Processed with Conventional or Microwave Energy Table 4 presents the test results of catalyst containing iMeH Cat 100 at two concentrations, 30 wt % and 50 wt %. These tests were processed using either conventional heat or microwave energy at the process conditions of 200° C., 50 psig, 0.5 LHSV. The USY powder was coated with 1 wt % palladium and mixed together with iMeH Cat 100 powder. All catalyst combination provided for higher hydrogen uptake and the production of the more fully saturated decalin. Conclusions drawn from this data include:

Hydrogen uptake is enhanced by combining the Pd coated USY with Cat 100
Hydrogen uptake increases with increased Cat 100 content
Hydrogen uptake is enhanced with microwaves Table 5 presents the test results of catalyst containing iMeH Cat 200 at two concentrations, 30 wt % and 50 wt %, and iMeH Cat 300 at the 50 wt % concentration. These tests were processed using either conventional heat or microwave energy at the process conditions of 200° C., 50 psig, 0.5 LHSV. The USY powder was coated with 1 wt % palladium and mixed together with iMeH powder. Conclusions drawn from this data include:

Cat 100 hydrogenates naphthalene better than Cat 200
Hydrogen uptake/decalin production, for Cat 200, is significantly enhanced with microwaves
Hydrogen uptake increases slightly with increased Cat 200 content
Cat 300 hydrogenates better than Cat 200 but less than Cat 100

The hydrogenation performance of each iMeH material can be explained by the level of monatomic hydrogen produced at the operating conditions of 200° C. and 50 psig. It should be noted that multiple test runs, under identical conditions, indicate a standard deviation of less than 3% of value for the increase in hydrogen content and for decalin production. Test results for the present invention now allow for a method to determine the proper pressure and temperature to maximize hydroprocessing given the input feedstock and the desired product.

Table 6 compares the performance of prior art or commercial catalysts. These tests were processed using either conventional heat or microwave energy at the process conditions of 200° C., 50 psig, 0.5 LHSV.

Commercial H-Oil catalyst was processed using microwave energy, as it is well known that it does not work well at low pressures. The lack of hydrogenation of current best practice catalysts demonstrates the effectiveness of iMeH catalysts of the present invention.

The second catalyst was a metal hydride prepared by conventional methods and tested using conventional heat. The lack of hydrogenation demonstrates that it does not function as an iMeH catalyst of the present invention.

Table 7 compares iMeH Cat 100 at two microwave energy power levels and in a partially oxidized state. These tests were processed using microwave energy at the process conditions of 200° C., 50 psig, 0.5 LHSV. All previous tests were conducted at a set microwave power level 1 estimated to be one watt/cm$^3$. A second microwave power level, power level 2, was selected for comparison and is estimated to be 1.9 watts/cm$^3$. For both microwave power levels, the microwave energy provides both the preheat energy and the reaction enhancement energy.

The test results show that significant increase in hydrogen uptake, 47% increase, and an increase in decalin production, 128%, was realized by adjusting the microwave to power level 2. It is thought that the higher microwave power setting provided more microwave energy to the reaction as the bulk temperatures were held to the same levels. The third catalyst, of the same composition, was prepared without the precautions taken according to the present invention to minimize the formation of an oxide layer on the iMeH. The resulting reduction of 58% hydrogen uptake and reduction of 99.8% of decalin production demonstrates the effectiveness of iMeH catalysts of the present invention.

EXAMPLE 7

Benzothiophene Ring Opening

Tests were done with the model compound benzothiophene to show desulfurization via ring opening. Benzothiophene is an aromatic, heterocyclic sulfur compound, with a side benzene ring, commonly found in petroleum ($C_8H_6S$). Tests were performed using a benzothiophene solution prepared with dodecane as a solvent and nonane as an internal standard.

The benzothiophene solution was processed using an iMeH Cat 300, 50% Cat300-50% USY (1% Pd), with microwave energy at 2.45 GHz, power level 2 at the processing conditions of 200° C., 50 psig, and 0.5 LHSV. 93% of benzothiophene was converted, and $H_2S$ gas was detected, demonstrating a hydrodesulfurization process via carbon-sulfur bond cleavage and ring opening.

EXAMPLE 8

Quantitative Hydrogenation Test Results for Commercial Test Feeds

The following tests were performed with commercial test feeds. These tests include light gas oil (LGO), coker-kero oil, and heavy vacuum gas oil (HVGO).

The present invention works at much lower pressures than existing hydroprocessing reactions. This provides additional flexibility in selecting process variables. For example, for any given feedstock, the process temperature and pressure determine the fraction of organic compounds in the vapor phase and the fraction in the liquid phase. Depending on the hydroprocessing reaction, controlling the vapor to liquid fraction ratio can improve the process efficiency. This is true at temperatures below 550° C. at pressures below 600 psig and especially for pressures below 300 psig.

The following test results provide one skilled in the art examples to determine the proper catalyst composition and reaction conditions (i.e. temperature, pressure, LHSV, microwave energy level) to maximize hydroprocessing for a given feedstock and desired product.

Light Gas Oil Hydrogenation Tests

Light Gas Oil (LGO) is petroleum fraction containing a complex mixture of hydrocarbons with a boiling point range from 140 to 450° C. at one atmosphere. 90% of the hydrocarbon compounds boil between 160-370° C. at ambient pressure. The level of aromatics in the LGO is estimated to be about 30 wt %. The feed was placed in a batch microwave reactor in quantities and time to treat the feed at 0.5 LHSV. An HCNS analyzer was used to measure the feed and product hydrogen to carbon (H/C) molar ratio. The higher the H/C ratio, the more hydrogen in the product. Test results are presented to show the increase in hydrogen content (wt %) added to the product.

LGO was processed using an iMeH Cat 300 catalyst, 50% Cat 300-50% USY (1% Pd). Two tests were performed using microwave energy at 2.45 GHz, power level 2, at two different operating pressures, 50 psig or 150 psig, at the same test conditions of 200° C., and 0.5 LHSV. At 50 psig, the LGO was hydrogenated increasing the hydrogen content in the product by 0.2 wt %. At 150 psig, the amount of hydrogenation increased by a factor of two to 0.4 wt %.

Coker-Kero Hydrogenation Tests

Table 8 shows test results with coker-kero feed. Coker-kero feed is a low-value product fraction from the coking process. It contains a complex mixture of organic compounds with a boiling point range from 160 to 400° C. 90% of the organic compounds boil between 200-360° C. It has a high-level of aromatic content, and a sulfur content of over 3.5 wt %.

Table 9 presents the coker-kero hydrogenation test results for an iMeH Cat 300, 50% Cat 300-50% USY (1% Pd). Three tests were performed using microwave energy at 2.45 GHz, power level 2, and 0.5 LHSV. The tests compare the effects of increasing either the operating temperature or operating pressure from the process conditions of 200° C., 50 psig, 0.5 LHSV.

The test results from Table 8 show that the iMeH Cat 300 catalyst was able to hydrogenate and to hydrodesulfurize the coker-kero. The level of hydrogenation doubled and the level of desulfurization increased by 8 fold when the operating pressure was changed from 50 psig to 150 psig. This same increase in hydrogenation and desulfurization was observed when the operating temperature was increased to 250° C. For this example a process pressure increase from 50 to 150 psig at 200° C. was approximately equal in hydrogenation performance to a change in process temperature from 200 to 250° C. at 50 psig.

These results are significant because this sulfur reduction, performed at low pressure, is due to hydrogenation of the sulfur-bearing compounds without the use of standard desulfurization catalysts such as Ni/Mo and Co/Mo. The palladium metal component of this catalyst is not generally used in industry for desulfurization because it is readily poisoned by sulfur.

Additional tests were carried out with a catalyst using 50% iMeH Cat 300 with a 50-50 mixture of USY (1% Pd) and a sulfided Ni/Mo supported alumina. The coker-kero was processed with a combination of conventional preheat and microwave energy. The process conditions were feed preheat to 400° C., reaction temperature 405° C., 150 psig, 0.5 LHSV. The average microwave power density at 2.45 GHz was estimated to be 0.12 watts/cm$^3$.

The analysis of the feed and product showed an increase in product hydrogen content of 0.51 wt % and the level of hydrodesulfurization was 57.3% (i.e. sulfur content reduced from 3.61 wt % sulfur to 1.54 wt % sulfur). It is believed the higher level of desulfurization is attributable to the addition of the sulfided Ni/Mo alumina to catalyst pellet. Table #9 shows the improvement of other physical properties including a 65% increase in the cetane index.

Heavy Vacuum Gas Oil Hydrogenation Tests

Heavy vacuum gas oil is obtained from the residue of atmospheric distillation using reduced pressures (25-100 mm Hg) to avoid thermal cracking. The boiling range is approximately 260 to 600° C. at one atmosphere pressure. The density is approximately 0.97 g/ml. The aromatic content is greater than 50% and the sulfur content is about 3.5 wt %.

Tests were carried out with a catalyst using 50% iMeH Cat 300 with a 50-50 mixture of USY (1% Pd) and a sulfided Ni/Mo supported on alumina. The HVGO feedstock was processed with a combination of conventional preheat and microwave energy. The process conditions were feed preheat to 400° C., reaction temperature 405° C., 150 psig, 0.5 LHSV. The average microwave power density at 2.45 GHz was estimated to be 0.12 watts/cm$^3$.

The analysis of the feed and product showed a slight increase in product hydrogen content of 0.08 wt % but the level of hydrodesulfurization was 68.8%. It is believed the higher level of desulfurization is attributable to the addition of the sulfided Ni/Mo alumina to catalyst pellet. Also, during the test ammonia was detected in the gas phase providing evidence of hydrodenitrogenation. Table #10 shows the improvement of other physical properties including a reduction in viscosity from 174 cSt to less than 7 cSt and a 55% increase in the API gravity.

TABLE 1

Percent iMeH Hydrogen Released

| | Cat 100 Heated to 200° C. | Cat 300 Heated to 350° C. |
|---|---|---|
| @ 0 psig | 100% | 100% |
| @ 50 psig | 52% | 48% |
| @ 100 psig | 25% | 23% |

TABLE 2

Properties of Pitch Residuum Before and After Microwave Processing

| SAMPLE | ASTM Test | Pitch Residuum | Microwave Processed Pitch |
|---|---|---|---|
| Specific Gravity @ 60° F. | D1298 | 1.001 | 0.998 |
| Sulfur, Wt % | D129 | 4.93 | 4.57 |
| Pour Point, ° F. | D97 | 95 | 30 |
| Kinematic Viscosity, cSt @ 50° C. or 100° C. | D445 | 413 @ 100° C. | 7.1 @ 50° C. |
| Simulated Distillation | D2887 | | |
| Naphtha (IBP-160° C.) vol % | | 0.0% | 0.0% |
| Kerosene (160-260° C.) vol % | | 2.0% | 20.0% |
| Diesel (260-370° C.) vol % | | 70.0% | 75.0% |
| HVGO (370-514° C.) vol % | | 28.0% | 5.0% |

TABLE 3

Naphthalene Hydrogenation Tests with Conventional Heat Comparing Catalyst with and without Pd to catalyst with iMeH Cat 100
Test Conditions: 200° C., 50 psig, 0.5 LHSV

| Catalyst Material | Process Energy | Increase in Hydrogen Content (wt %) | Decalin % Produced |
|---|---|---|---|
| 100% USY | Conventional | 0.0% | 0.0% |
| 100% USY (1% Pd) | Conventional | 1.6% | 0.0% |
| 30% Cat 100-70% USY (No Pd) | Conventional | 1.9% | 0.0% |

TABLE 4

Naphthalene Hydrogenation Tests Comparing Catalyst with iMeH Cat 100 Processed with Conventional Heat or Microwave Energy
Test Conditions: 200° C., 50 psig, 0.5 LHSV

| Catalyst Material | Process Energy | Increase in Hydrogen Content (wt %) | Decalin % Produced |
|---|---|---|---|
| 30% Cat 100-70% USY (1% Pd) | Conventional | 2.9% | 1.4% |
| 30% Cat 100-70% USY (1% Pd) | Microwave | 3.2% | 9.9% |
| 50% Cat 100-50% USY (1% Pd) | Microwave | 4.5% | 40.9% |

TABLE 5

Naphthalene Hydrogenation Tests Processed with Conventional Heat or Microwave Energy for Catalysts Containing iMeH Cat 200 or iMeH Cat 300
Test Conditions: 200° C., 50 psig, 0.5 LHSV

| Catalyst Material | Process Energy | Increase in Hydrogen Content (wt %) | Decalin % Produced |
|---|---|---|---|
| 30% Cat 200-70% USY (1% Pd) | Conventional | 2.6% | 0.0% |
| 30% Cat 200-70% USY (1% Pd) | Microwave | 3.4% | 14.3% |
| 50% Cat 200-50% USY (1% Pd) | Microwave | 3.5% | 17.8% |
| 50% Cat 300-50% USY (1% Pd) | Microwave | 3.8% | 24.0% |

TABLE 6

Naphthalene Hydrogenation Tests for Comparison to Prior Art Catalysts and Metal Hydride Processed with Conventional Heat or Microwave Energy
Test Conditions: 200° C., 50 psig, 0.5 LHSV

| Catalyst Material | Process Energy | Increase in Hydrogen Content (wt %) | Decalin % Produced |
|---|---|---|---|
| H-Oil Catalyst | Microwave | 0.1% | 0.0% |
| Conventional Metal Hydride | Conventional | 0.1% | 0.0% |

TABLE 7

Naphthalene Hydrogenation Tests Comparing iMeH Cat 100 at Two Microwave Energy Power Levels and in a Partially Oxidized State
Test Conditions: 200° C., 50 psig, 0.5 LHSV

| Catalyst Material | Process Energy | Increase in Hydrogen Content (wt %) | Decalin % Produced |
|---|---|---|---|
| 50% Cat 100-50% USY (1% Pd) | Microwave Power Level 1 | 4.5% | 40.9% |
| 50% Cat 100-50% USY (1% Pd) | Microwave Power Level 2 | 6.5% | 93.4% |
| 50% Oxidized Cat 100-50% USY (1% Pd) | Microwave Power Level 2 | 2.7% | 0.2% |

TABLE 8

Coker-Kero Hydrogenation Test Results Processed with Microwave Energy for iMeH Cat 300 Catalyst, 50% Cat 300-50% USY (1% Pd), at Three Combinations of Operating Temperatures and Pressures
Test Condition: 0.5 LHSV

| Process Temperature (° C.) | Process Pressure (psig) | Increase in Hydrogen Content (wt %) | % Sulfur Reduction |
|---|---|---|---|
| 200 | 50 | 0.24% | 5.5% |
| 200 | 150 | 0.42% | 42.4% |
| 250 | 50 | 0.44% | 44.6% |

TABLE 9

Physical Properties of Coker-Kero Before and After Processing
Catalyst: 50% Cat 300-25% USY (1% Pd)-25% sulfided Ni/Mo Alumina
Process Energy: Combination of Conventional Preheat and Microwave Energy
Test Conditions: 405° C., 150 psig, 0.5 LHSV

| Physical Property | Coker-Kero Feed | Processed Product |
|---|---|---|
| Cetane Index (ASTM D4737) | 27 | 44 |
| API Gravity | 27 | 32 |
| Density @ 15° C. (gm/cc) | 0.90 | 0.87 |
| Viscosity @ 40° C. (cSt) | 3.7 | 1.6 |

TABLE 10

Physical Properties of HVGO Before and After Processing
Catalyst: 50% Cat 300-25% USY (1% Pd)-25% sulfided Ni/Mo Alumina
Process Energy: Combination of Conventional Preheat and Microwave Energy
Test Conditions: 405° C., 150 psig, 0.5 LHSV

| Physical Property | HVGO Feed | Processed Product |
|---|---|---|
| Cetane Index (ASTM D4737) | −40 | 20 |
| API Gravity | 15 | 23 |
| Density @ 15° C. (gm/cc) | 0.97 | 0.91 |
| Viscosity @ 40° C. (cSt) | 174 | 6.8 |

The invention claimed is:

1. A method for hydroprocessing an organic compound, the method comprising:

contacting the organic compound with a catalyst comprising an interstitial metal hydride having a reaction surface and interstitial hydrogen-storing sites, to produce a catalyst-organic compound mixture, wherein the catalyst has monatomic hydrogen at the reaction surface and at least a portion of the monatomic hydrogen is desorbed from the interstitial hydrogen-storing sites; and applying energy which is at least one of microwave energy, radiofrequency (RF) energy, and acoustic energy, and combinations thereof to at least one of the catalyst and the catalyst-organic compound mixture to control a reaction between the organic compound and the monatomic hydrogen at the reaction surface.

2. The method of claim 1, wherein the energy which is at least one of microwave energy, RF energy, acoustic energy and combinations thereof is used in conjunction with resistive heating, heating resulting from a chemical reaction, combustive heating, and combinations thereof.

3. The method of claim 1, wherein the energy is microwave energy or RF energy; and wherein the metal hydride functions as a primary RF energy or microwave energy absorber component.

4. The method of claim 1, wherein the organic compound is preheated.

5. The method of claim 1, wherein the interstitial metal hydride comprises a hydride of at least one of an $AT_5$ alloy, an $A_2T_{14}B$ alloy and an $A_2T$ alloy and combinations thereof, wherein, for the $AT_5$ alloy, the general formula is $A_{1-x}M_x T_{5-y-z}B_yC_z$ with $x=0.0-1.0$, $y=0.0-2.5$, $z=0.0-0.5$; A=Mm (Mischmetal); T=Ni; M=La, Pr or Ce; B=Co; C=Mn, Al or Cr;

wherein, for the $A_2T_{14}B$ alloy, the general formula is $A_{2-x}M_xT_{14-y}C_yD_zB$ with $x=0.0-2.0$, $y=0.0-14$, $z=0.0-3.0$; A=Nd, T=Fe, M=La, Pr or Ce, B=Boron; C=Co; D=Cr, Ni or Mn; and wherein, for the $A_2T$ alloy, the general formula is $A_{2-x}M_x T_{1-y}B_y$ with $x=0.0-0.5$, $y=0.0-0.5$; A=Mg; T=Ni or Cu; M=La; B=Fe or Co.

6. The method of claim 1, wherein the catalyst comprises an interstitial metal hydride of at least one of $Mm_{(1.1)}Ni_{(4.22)}CO_{(0.42)}Al_{(0.15)}Mn_{(0.15)}$, $Nd_{(2.05)}Dy_{(0.25)}Fe_{(13)}B_{(1.05)}$ and $Mg_{(2.05)}Ni_{(0.95)}Cu_{(0.07)}$, and combinations thereof.

7. The method of claim 1, wherein the catalyst further comprises a support substance comprising at least one of silica, zeolites, aluminas, and combinations thereof.

8. The method of claim 7, wherein the catalyst further comprises at least one of Pt, Pd and a combination thereof.

9. The method of claim 1, wherein applying energy to the catalyst comprises exposing the catalyst to the RF or microwave energy, and wherein the catalyst has a dielectric loss factor of less than 0.30.

10. The method of claim 1, wherein the interstitial metal hydride is in the form of a particle having a diameter; and wherein any oxide layer on the reaction surface is minimized and does not exceed a thickness equal to or less than half the diameter of the interstitial metal hydride particle.

11. The method of claim 10, wherein the thickness of the oxide layer is equal to or less than one quarter the diameter of the interstitial metal hydride particle.

12. The method of claim 10, wherein the thickness of the oxide layer is equal to or less than one tenth the diameter of the interstitial metal hydride particle.

13. The method of claim 1, wherein exposure of the catalyst to oxygen and water vapor at elevated temperatures is minimized.

14. The method of claim 1, wherein the reaction between the organic compound and the monatomic hydrogen at the reaction surface is carried out in the temperature range from about 150° C. to about 600° C.

15. The method of claim 14, wherein the reaction between the organic compound and the monatomic hydrogen at the reaction surface is carried out in the temperature range from about 300° C. to about 450° C.

16. The method of claim 1, wherein the reaction between the organic compound and the monatomic hydrogen at the reaction surface is carried out in the pressure range from about ambient pressure to about positive 600 psig.

17. The method of claim 16, wherein the reaction between the organic compound and the monatomic hydrogen at the reaction surface is carried out in the pressure range from about positive 50 psig to about positive 300 psig.

18. The method of claim 1, wherein the reaction between the organic compound and the monatomic hydrogen at the reaction surface is carried out in the liquid hourly space velocity range from about 0.10 per hour to about 10 per hour.

19. The method of claim 18, wherein the reaction between the organic compound and the monatomic hydrogen at the reaction surface is carried out in the liquid hourly space velocity range from about 0.30 per hour to about 3 per hour.

20. The method of claim 1, wherein the energy is the microwave or RF energy and has a frequency in the range from about 1 MHz to about 10,000 MHz.

21. The method of claim 20, wherein the microwave or RF energy has a frequency in the range from about 500 MHz to about 3,000 MHz.

22. The method of claim 1, wherein the reaction surface is substantially free of an oxide layer.

23. The method of claim 1, wherein the organic compound is a petrochemical.

24. A method for hydroprocessing an organic compound, the method comprising:

contacting the organic compound with a catalyst comprising an interstitial metal hydride having a reaction surface and interstitial hydrogen-storing sites, to produce a catalyst-organic compound mixture, wherein the catalyst has monatomic hydrogen at the reaction surface and at least a portion of the monatomic hydrogen is desorbed from the interstitial hydrogen-storing sites;

applying energy which is at least one of microwave energy, radiofrequency (RF) energy, and acoustic energy, and combinations thereof to at least one of the catalyst and the catalyst-organic compound mixture to control a reaction between the organic compound and the monatomic hydrogen at the reaction surface; and providing gaseous hydrogen while the monatomic hydrogen is reacted with the organic compound.

25. The method of claim 24, wherein the energy which is at least one of microwave energy, RF energy, acoustic energy, and combinations thereof is used in conjunction with resistive heating, heating resulting from a chemical reaction, combustive heating, and combinations thereof.

26. The method of claim 25, wherein the energy is the microwave energy or RF energy; and wherein the metal hydride functions as a primary RF energy or microwave energy absorber component.

27. The method of claim 24, wherein the organic compound is preheated.

28. The method of claim 24, wherein the interstitial metal hydride comprises a hydride at least one of an $AT_5$ alloy, an $A_2T_{14}B$ alloy and an $A_2T$ alloy, and combinations thereof, wherein, for the $AT_5$ alloy, the general formula is $A_{1-x}M_x T_{5-y-z}B_yC_z$ with $x=0.0-1.0$, $y=0.0-2.5$, $z=0.0-0.5$; A=Mm (Mischmetal); T=Ni; M=La, Pr or Ce; B=Co; C=Mn, Al or Cr;

wherein, for the $A_2T_{14}B$ alloy, the general formula is $A_{2-x}M_xT_{14-y}C_yD_zB$ with $x=0.0-2.0$, $y=0.0-14$, $z=0.0-3.0$; A=Nd, T=Fe, M=La, Pr or Ce, B=Boron; C=Co; D=Cr, Ni or Mn; and wherein, for the $A_2T$ alloy, the general formula is $A_{2-x}M_x T_{1-y}B_y$ with $x=0.0-0.5$, $y=0.0-0.5$; A=Mg; T=Ni or Cu; M=La; B=Fe or Co.

29. The method of claim 24, wherein the catalyst comprises an interstitial metal hydride of at least one of $Mm_{(1.1)}Ni_{(4.22)}CO_{(0.42)}Al_{(0.15)}Mn_{(0.15)}$, $Nd_{(2.05)}Dy_{(0.25)}Fe_{(13)}B_{(1.05)}$ and $Mg_{(2.05)}Ni_{(0.95)}Cu_{(0.07)}$, and combinations thereof.

30. The method of claim 24, wherein the catalyst further comprises a support substance comprising at least one of silica, zeolites, aluminas, and combinations thereof.

31. The method of claim 30, wherein the catalyst further comprises at least one of Pt, Pd and a combination thereof.

32. The method of claim 24, wherein applying energy to the catalyst comprises exposing the catalyst to the RF or microwave energy, and wherein the catalyst has a dielectric loss factor of less than 0.30.

33. The method of claim 24, wherein the interstitial metal hydride is in the form of a particle having a diameter; and wherein any oxide layer on the reaction surface is minimized and does not exceed a thickness equal to or less than half the diameter of the interstitial metal hydride particle.

34. The method of claim 33, wherein the thickness of the oxide layer is equal to or less than one quarter the diameter of the interstitial metal hydride particle.

35. The method of claim 33, wherein the thickness of the oxide layer is equal to or less than one tenth the diameter of the interstitial metal hydride particle.

36. The method of claim 24, wherein exposure of the catalyst to oxygen and water vapor at elevated temperatures is minimized.

37. The method of claim 24, wherein the reaction between the organic compound and the monatomic hydrogen at the reaction surface is carried out in the temperature range from about 150° C. to about 600° C.

38. The method of claim 37, wherein the reaction between the organic compound and the monatomic hydrogen at the reaction surface is carried out in the temperature range from about 300° C. to about 450° C.

39. The method of claim 24, wherein the reaction between the organic compound and the monatomic hydrogen at the reaction surface is carried out in the pressure range from about ambient pressure to about positive 600 psig.

40. The method of claim 39, wherein the reaction between the organic compound and the monatomic hydrogen at the reaction surface is carried out in the pressure range from about positive 50 psig to about positive 300 psig.

41. The method of claim 24, wherein the reaction between the organic compound and the monatomic hydrogen at the reaction surface is carried out in the liquid hourly space velocity range from about 0.10 per hour to about 10 per hour.

42. The method of claim 41, wherein the reaction between the organic compound and the monatomic hydrogen at the reaction surface is carried out in the liquid hourly space velocity range from about 0.30 per hour to about 3 per hour.

43. The method of claim 24, wherein the energy is the microwave or RF energy and has a frequency in the range from about 1 MHz to about 1,000 MHz.

44. The method of claim 43, wherein the microwave or RF energy has a frequency in the range from about 500 MHz to about 3,000 MHz.

45. The method of claim 24, wherein the reaction surface is substantially free of an oxide layer.

46. A method for hydroprocessing an organic compound, comprising:

contacting an organic compound with a catalyst comprising an interstitial metal hydride having a reaction surface and interstitial hydrogen-storing sites, wherein the catalyst has monatomic hydrogen at the reaction surface and at least a portion of the monatomic hydrogen is desorbed from the interstitial hydrogen-storing sites and wherein the reaction surface is substantially free of an oxide layer, to produce a catalyst-organic compound mixture and;

applying energy which is at least one of microwave energy, radiofrequency (RF) energy, and acoustic energy, and combinations thereof to at least one of the catalyst and the catalyst-organic compound mixture to control a reaction between the organic compound and the monatomic hydrogen at the reaction surface.

47. A method of producing hydroprocessed organic compounds, comprising:

reacting organic compounds with monatomic hydrogen to produce hydroprocessed organic compounds by:

contacting the organic compounds with a catalyst comprising an interstitial metal hydride having a reaction surface and interstitial hydrogen-storing sites, to produce a catalyst-organic compound mixture, wherein the catalyst has monatomic hydrogen at the reaction surface and at least a portion of the monatomic hydrogen is desorbed from the interstitial hydrogen-storing sites; and applying energy which is at least one of microwave energy, radiofrequency (RF) energy, and acoustic energy, and combinations thereof, to at least one of the catalyst and the catalyst-organic compound mixture to control a reaction between the organic compounds and the monatomic hydrogen at the reaction surface.

48. A method of hydroprocessing an organic compound, comprising:

subjecting an organic compound to a reaction with monatomic hydrogen, the reaction comprising:

contacting the organic compound with a catalyst comprising an interstitial metal hydride having a reaction surface and interstitial hydrogen-storing sites, to produce a catalyst-organic compound mixture, wherein the catalyst has monatomic hydrogen at the reaction surface and at least a portion of the monatomic hydrogen is desorbed from the interstitial hydrogen-storing sites; and applying energy which is at least one of microwave energy, radiofrequency (RF) energy, and acoustic energy, and combinations thereof, to at least one of the catalyst and the catalyst-organic compound mixture to control a reaction between the organic compound and the monatomic hydrogen at the reaction surface.

49. A method of hydroprocessing an organic compound, comprising:

subjecting an organic compound to a reaction with monatomic hydrogen and, conducting the reaction in the presence of a catalyst comprising an interstitial metal hydride having a reaction surface and interstitial hydrogen-storing sites, the catalyst having monatomic hydrogen at the reaction surface and at least a portion of the monatomic hydrogen being desorbed from the interstitial hydrogen-storing sites, and energy which is microwave energy, radiofrequency (RF) energy, acoustic energy or combinations thereof;

the catalyst contacting the organic compound to produce a catalyst-organic compound mixture; the energy applied to at least one of the catalyst and the catalyst-organic compound mixture to control a reaction between the organic compound and the monatomic hydrogen; the monatomic hydrogen reacting with the organic compound at the reaction surface.

* * * * *